(12) United States Patent
Yuan et al.

(10) Patent No.: US 9,404,038 B2
(45) Date of Patent: Aug. 2, 2016

(54) CYCLOPROPYL-BEARING LIQUID CRYSTAL COMPOUNDS AND MIXTURES

(71) Applicant: Shijiazhuang Chengzhi Yonghua Display Materials Co., Ltd., Shi Jia Zhuang (CN)

(72) Inventors: Guoliang Yuan, Shi Jia Zhuang (CN); Jia Deng, Shi Jia Zhuang (CN); Ming Li, Shi Jia Zhuang (CN); Hu-bo Zhang, Shi Jia Zhuang (CN); Yun-xia Qiao, Shi Jia Zhuang (CN); Jin-song Meng, Shi Jia Zhuang (CN); Rui-mao Hua, Shi Jia Zhuang (CN)

(73) Assignee: Shijiazhuang Chengzhi Yonghua Display Materials Co., Ltd., Shi Jia Zhuang (CN)

( * ) Notice: Subject to any disclaimer, the term of this patent is extended or adjusted under 35 U.S.C. 154(b) by 0 days.

(21) Appl. No.: 14/719,700

(22) Filed: May 22, 2015

(65) Prior Publication Data

US 2016/0168461 A1  Jun. 16, 2016

(30) Foreign Application Priority Data

Dec. 12, 2014  (CN) .......................... 2014 1 0764634

(51) Int. Cl.
| | | |
|---|---|---|
| *G02F 1/1333* | (2006.01) | |
| *C09K 19/12* | (2006.01) | |
| *C09K 19/30* | (2006.01) | |
| *C09K 19/34* | (2006.01) | |

(52) U.S. Cl.
CPC ............. *C09K 19/12* (2013.01); *C09K 19/3003* (2013.01); *C09K 19/3066* (2013.01); *C09K 19/3402* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3422* (2013.01)

(58) Field of Classification Search
CPC ............... C09K 19/12; C09K 19/3066; C09K 19/3003; C09K 19/3402; C09K 2019/3009; C09K 2019/3004; C09K 2019/301; C09K 2019/3016; C09K 2019/3422; C09K 2019/3019; C09K 2019/123; C09K 2019/122; G02F 1/1333
USPC ............... 252/299.01, 299.6, 299.61, 299.62, 252/299.63, 299.66; 428/1.1; 349/182
See application file for complete search history.

(56) References Cited

FOREIGN PATENT DOCUMENTS

| DE | 4027923 | * | 3/1991 | ......... C09K 19/3003 |
| DE | 4327748 | * | 8/1993 | ......... C09K 19/3003 |
| JP | 10067694 | * | 3/1998 | ......... C09K 19/3003 |

* cited by examiner

*Primary Examiner* — Geraldina Visconti
(74) *Attorney, Agent, or Firm* — Blank Rome LLP

(57) ABSTRACT

The present invention is directed to compounds of the following General Formula I. The cyclopropyl-bearing liquid crystal compounds of Formula I of the present invention have a positive or negative dielectric anisotropy ($\Delta\in$), an appropriate optical anisotropy ($\Delta n$), an appropriate clearing point (CP), good low-temperature miscibility with other liquid crystals, a low rotary viscosity, and good UV stability and high-temperature thermal stability, and therefore have good use value. The compounds of the present invention can be used for preparing positive and negative liquid crystal compositions and can also be employed in passive and active matrix displays.

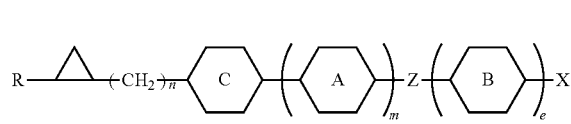

11 Claims, 3 Drawing Sheets

CYCLOPROPYL-BEARING LIQUID CRYSTAL COMPOUNDS AND MIXTURES

CROSS REFERENCE TO RELATED APPLICATIONS

This application claims the benefit of Chinese Application No. 201410764634.4, entitled "Cyclopropyl-Bearing Liquid Crystal Compounds and Mixtures" and filed Dec. 12, 2014, the contents of which application are incorporated herein by reference.

FIELD OF THE INVENTION

The present invention relates to the field of liquid crystal compounds and use thereof, and is specifically directed to cyclopropyl-bearing liquid crystal compounds and mixtures.

BACKGROUND OF THE INVENTION

Although Austrian scientist F. Reinitzer successfully synthesized the liquid crystal for the first time in 1888, there was no real development of the liquid crystal industry until about 30 year ago. Due to the many obvious advantages of liquid crystal display materials, such as low driving voltage, micro power consumption, high reliability, being able to display large amounts of information, color display, flicker-free and being able to realize flat-panel display, the liquid crystal monomers and liquid crystal display have undergone great development. So far, the liquid crystal monomers can be synthesized into over 10,000 liquid crystal materials, of which, more than 1,000 liquid crystal materials are commonly and frequently used, and can be classified into different categories by the characteristics of the central bridge bond and ring of the liquid crystal molecule, which mainly include biphenyl liquid crystals, phenylcyclohexane liquid crystals, ester liquid crystals, alkynyl liquid crystal, liquid crystals with difluoromethoxy bridge, ethane liquid crystals and heterocyclic liquid crystals, etc. And liquid crystal display has developed from the small TN or STN black and white screen to the big TN-TFT, VA-TFT, IPS-TFT or PDLC color screen.

Major novel liquid crystal display modes include optical compensated bend (OCB), in-plane switching (IPS), vertical alignment (VA), the axis of symmetry microstructure LCD (ASM), twisted multi-domain liquid crystal display and the like.

The liquid crystal cell of different display mode differs in design, driving method, liquid crystal molecule director and direction of glass substrate; and the liquid crystal molecule director and the direction of glass substrate of the OCB mode and IPS mode are parallel, while the liquid crystal molecule director and the direction of glass substrate of the VA mode and the ASM mode is perpendicular when there is no applied electric field.

For IPS in parallel arrangement, the dielectric anisotropy ($\Delta\varepsilon$) of the liquid crystal can be positive or negative.

In VA mode, all molecules of liquid crystal are perpendicular with the direction of glass substrate and parallel with the vertical incident right, when there is no applied electric field. And a good dark state will be displayed when the polaroids are orthogonal, which enables such device to have good contrast ratio, and in this case the dielectric anisotropy ($\Delta\varepsilon$) of the liquid crystal must be negative. The optical anisotropy ($\Delta n$), the thickness of the liquid crystal cell (d) and the wave length of incident right ($\lambda$) of the liquid crystal hardly influence the contrast ratio. Besides, the response time of the VA mode is much shorter than the twisted devices, about half of that of the latter. Under the influence of applied voltage, VA devices will mainly produce the bend deformation of liquid crystal molecules, and ECB devices will produce the splay deformation of liquid crystal molecules and the twisted display devices will produce the twist deformation of the liquid crystal molecules, and their response time will be respectively in reverse proportion to the bend, splay and twist elastic constant. And for most liquid crystals, its bend elastic constant is usually larger than its splay elastic constant, and its splay elastic constant is larger than the twist elastic constant, that is the reason why the response time of VA devices is relatively faster.

In order to further idealize the performance of the display devices, researchers are always devoted to study new liquid crystal compounds, and this contributes to the constant development of the liquid crystal compounds and display devices.

Despite the application of cyclopropyl structure in liquid crystal compounds was reported, the considerable performance deficiencies in the then-reported compounds such as poor structure stability, large viscosity and difficult to synthesize have prevent them from practical application.

SUMMARY OF THE INVENTION

Surprisingly, the cyclopropyl-bearing liquid crystal compounds with structural characteristics of Formula I have a positive or negative dielectric anisotropy ($\Delta\varepsilon$), an appropriate optical anisotropy ($\Delta n$), a relatively high clearing point (CP), outstanding low-temperature miscibility with other liquid crystals, a low rotary viscosity ($\gamma_1$), and good UV stability and high-temperature thermal stability, and can be applied for the preparation of liquid crystal compounds of all types, and therefore have extensive and good application value.

Disclosed in the present invention is the liquid crystal compound of Formula I:

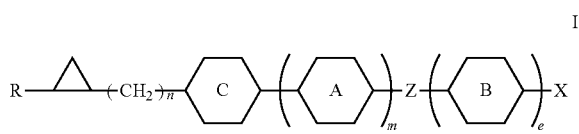

wherein, R represents a hydrogen atom (H) or a C1-C5 alkyl;

m, e, n each can be 0, 1 or 2;

Z represents a single bond, —CF$_2$O—, —CH$_2$CH$_2$—, —CH$_2$O—, —C≡C—, —OCH$_2$— or —OCF$_2$—

X represents F, Cl, OCF$_3$, CF$_3$, CN, H, a C1-C5 alkyl, a C1-C5 alkoxy, a C2-C5 alkenoxy, a C2-C5 alkenyl or a C2-C5 fluoro-substituted alkenyloxy;

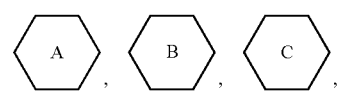

each independently represents the phenylene, fluoro-substituted phenylene, cyclohexylidene and one or more of the groups generated from the substitution of one or two unconnected CH2 in the cyclohexylidene by oxygen (O).

As a preferred embodiment, when n=1 or 2, the said

=phenylene or fluoro-substituted phenylene; when n=0, the said

=cyclohexylidene or the group or groups generated from the substitution of one or two unconnected $CH_2$ in the cyclohexylidene by oxygen (O).

The pure compounds of Formula I are colorless, and will have different properties when the values of R,

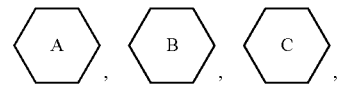

Z, X, m and n differ. The said compounds can be applied for preparing positive or negative liquid crystal mixtures and for multi-mode display devices, for example, OCB, TN, STN, positive or negative IPS, positive or negative FFS, PVA, MVA, PSVA and $UN^2A$, and therefore have a wide scope of application.

In addition, the said compounds can be used as base materials for liquid crystal mixtures, and may also be employed as additional materials to be added into the liquid crystal base materials composed of compounds of other types, for such purposes as to improve the dielectric anisotropy ($\Delta\in$) and/or rotary viscosity ($\gamma 1$) and/or threshold voltage ($V_{th}$) and/or low-temperature contrast ratio and/or optical anisotropy ($\Delta n$) and/or clearing point (Cp).

The liquid crystal compounds of Formula I can be compounds containing difluoro-methylenedioxy, for example, compounds of Formulas (I 1-I 9):

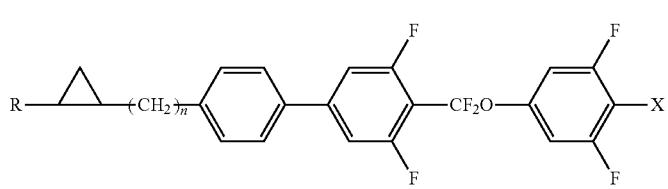

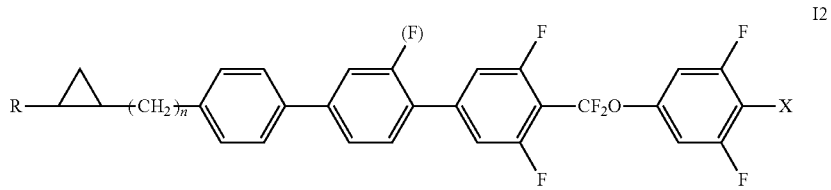

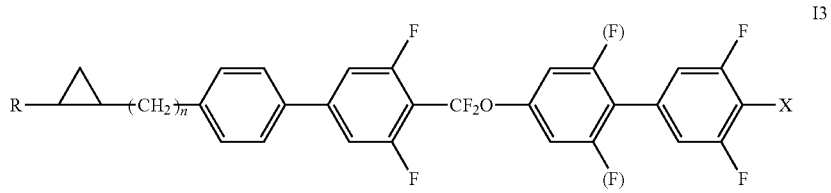

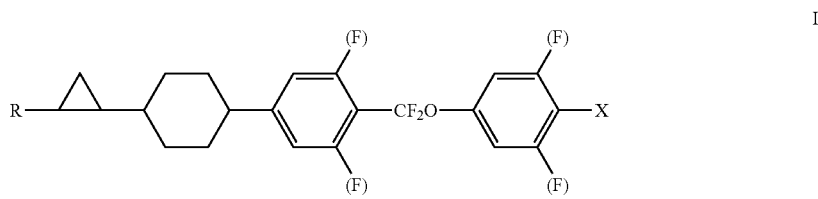

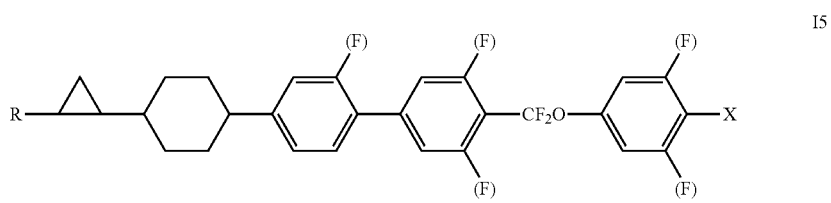

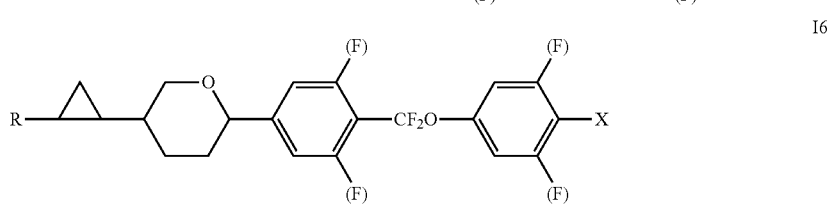

I7

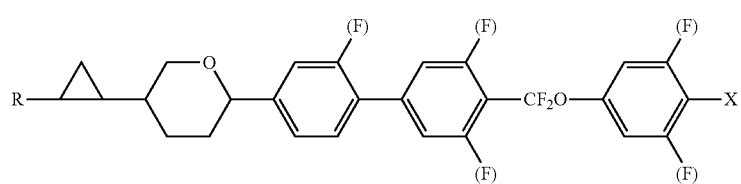

I8

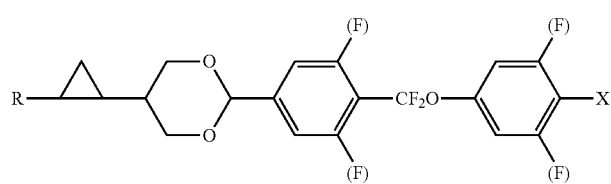

I9

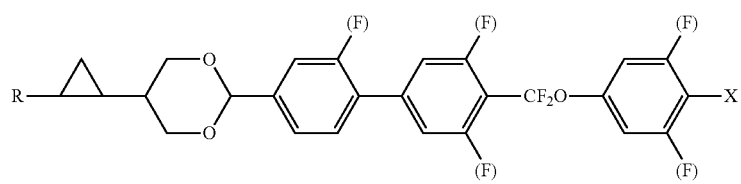

wherein, the definitions of R, n, X are same as defined in Formula I, and n is preferably 1 or 2, and (F) independently represents F or H.

Compounds with difluoro-methylenedioxy linking group in Formulas (I 1-I 6) have in particular a large dielectric anisotropy (Δn), a large or appropriate optical anisotropy (Δn), good low-temperature miscibility with other liquid crystals, a low rotary viscosity, and good UV stability and high-temperature thermal stability.

Compounds with difluoro-methylenedioxy linking group in Formulas (I 1-I 6) have different values of R,

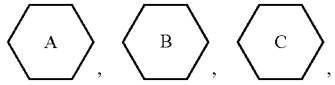

Z, m and n, and when all variables have big or small polarization towards the molecule long axis direction, the value of dielectric anisotropy (Δ∈) can be between 5-50, X is preferably F, –(F) is preferably —F, and the value of dielectric anisotropy (Δ∈) of the preferred structure is between 20-40, and the preferred structure will also have a low rotary viscosity (γ1); due to the different conjugation extent of liquid crystal molecules of different structures, the optical anisotropy (Δn) can be between 0.05-0.40; and when m+n=2, the clearing point will be relatively low, however, when m+n>2, the clearing point can be as high as 100° C. or even over 150° C. In addition to such characteristics, compounds with difluoro-methylenedioxy linking group in Formulas (I 1-I 6) also have good low-temperature miscibility with other liquid crystals and are therefore able to improve the low temperature characteristics of the mixed liquid crystal.

Liquid crystal compounds of Formula I, for example, compounds of Formulas (II 1-II 13):

II1

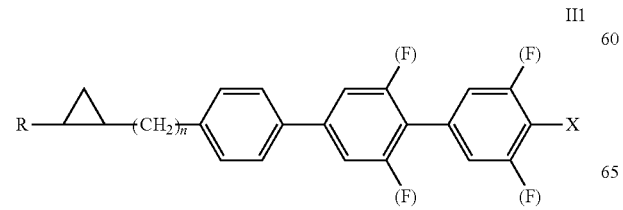

-continued

II2

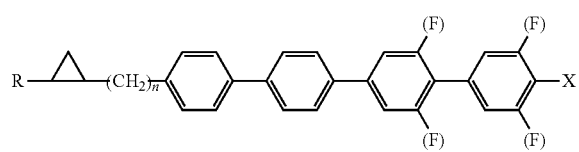

II3

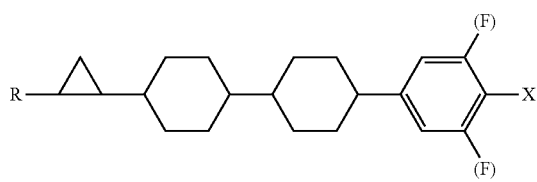

II4

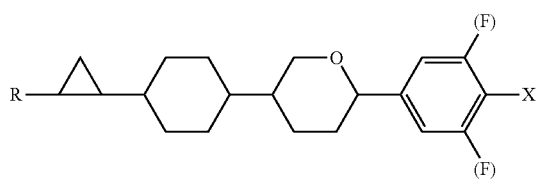

II5

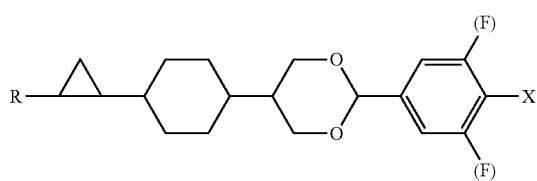

II6

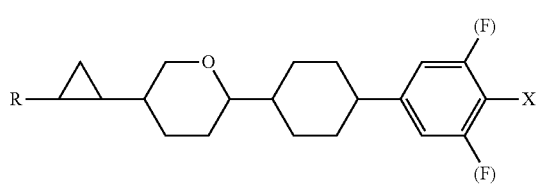

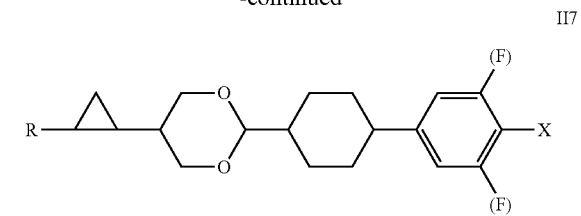
II7

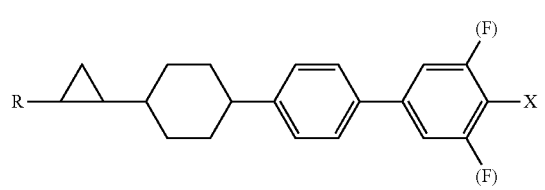
II8

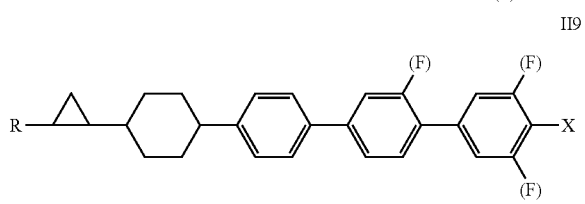
II9

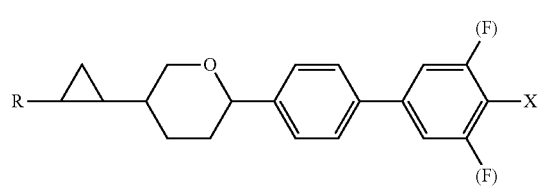
II10

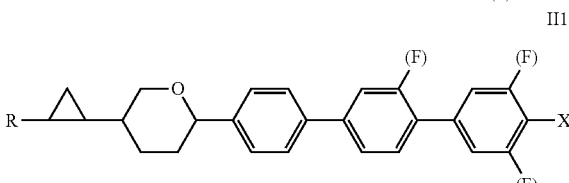
II11

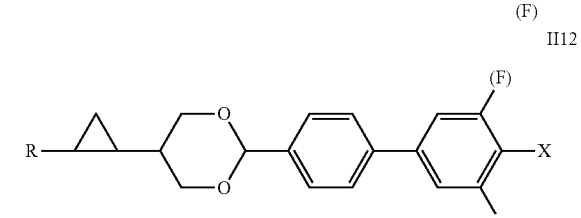
II12

II13 wherein, the definitions of R, n, X are same as defined in Formula I, and n is preferably 1 or 2, and (F) independently represents F or H.

Compounds of Formulas (II 1-II 13) have a large dielectric anisotropy (Δ∈), a wide range of optical anisotropy (Δn), good low-temperature miscibility with other liquid crystals, a low rotary viscosity (γ1), a relatively high clearing point (CP) and good UV stability and high-temperature thermal stability.

Compounds of Formulas (II 1-II 13) have different values of R,

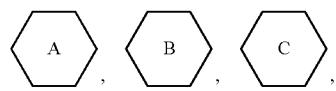

Z, m and n, and when all variables have big or small polarization towards the molecule long axis direction, the value of dielectric anisotropy (Δ∈) can be between 0-30, X is preferably F, -(F) is preferably —F, and the value of dielectric anisotropy (Δ∈) of the preferred structure is between 5-25; due to the different conjugation extent of liquid crystal molecules of different structures, the optical anisotropy (Δn) can be between 0.05-0.40; and when m+n=2, the clearing point can be between 20-150° C., however, when m+n>2, the clearing point can be as high as 150° C. or even over 250° C. In addition to such characteristics, compounds of Formulas (II 1-II 13) also have good low-temperature miscibility with other liquid crystals and are therefore able to improve the low temperature characteristics of the mixed liquid crystal.

Liquid crystal compounds of Formula I, for example, compounds of Formulas (III1-III12):

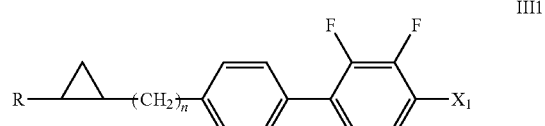
III1

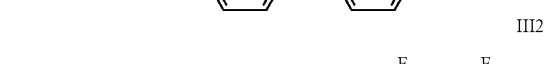
III2

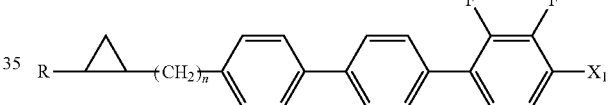
III3

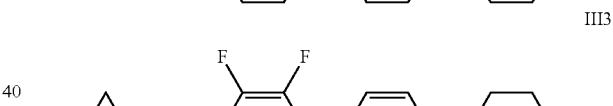
III4

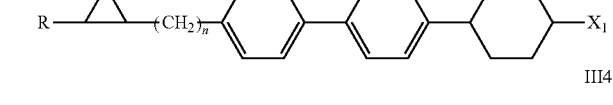
III5

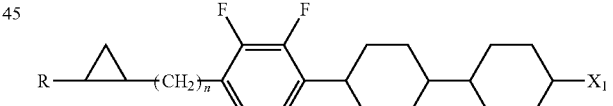
III6

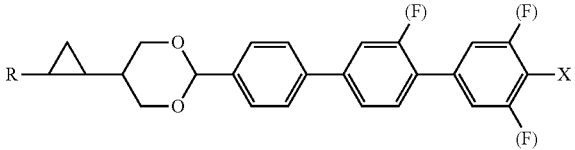
III7

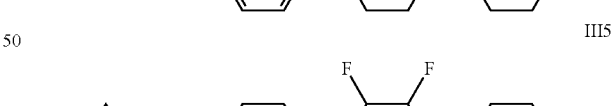

-continued

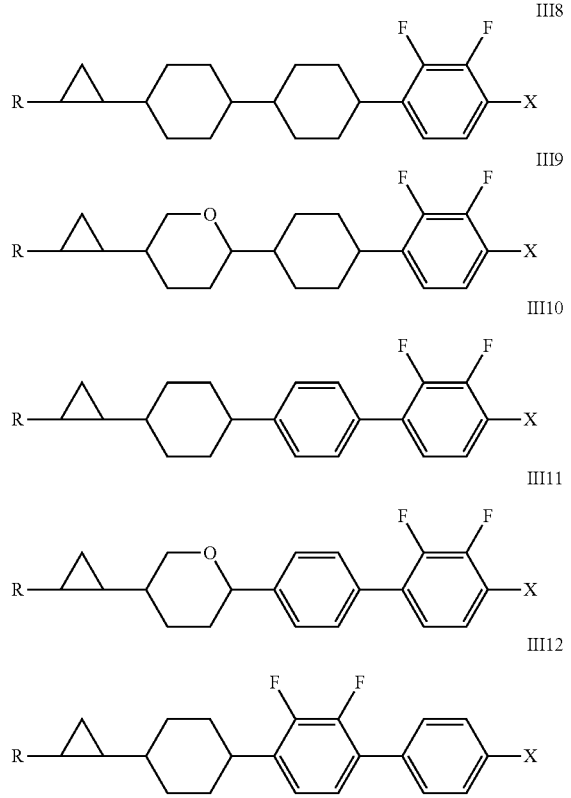

wherein, the definitions of R, n, X are same as defined in Formula I, and n is preferably 1 or 2, and (F) independently represents F or H, $X_1$ represents a C1-C5 alkyl, C1-C5 alkoxy, C2-C5 alkenoxy or C2-C5 alkenyl, and $X_1$ is preferably a C1-C5 alkyl or C1-C5 alkoxy.

Compounds of Formulas (III1-III5) have a large negative dielectric anisotropy (Δ∈), a wide range of optical anisotropy (Δn), good low-temperature miscibility with other liquid crystals, a low rotary viscosity (γ1), a relatively high clearing point (CP) and good UV stability and high-temperature thermal stability.

Compounds of Formulas (III1-III12) with negative dielectric anisotropy (Δ∈) can be used for distributing compounds with positive and negative dielectric anisotropy (Δ∈), in particular for distributing compounds with negative dielectric anisotropy (Δ∈), and have different values of R,

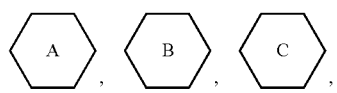

Z, X, m and n, and when all variables have big or small polarization towards the molecule short axis direction, the value of dielectric anisotropy (Δ∈) can be between −10-0; due to the different conjugation extent of liquid crystal molecules of different structures, the optical anisotropy (Δn) can be between 0.05-0.40; and when m+n=2, the clearing point can be between 0-100° C., however, when m+n>2, the clearing point can be over 100° C. or even reach 200° C. In addition to such characteristics, compounds of Formulas (III1-III12) also have good low-temperature miscibility with other liquid crystals and are therefore able to improve the low temperature characteristics of the mixed liquid crystal.

Compounds of Formula I can preferably be compounds of Formulas (IV1-IV6), (V 1-V 11) and (VI1-VI7):

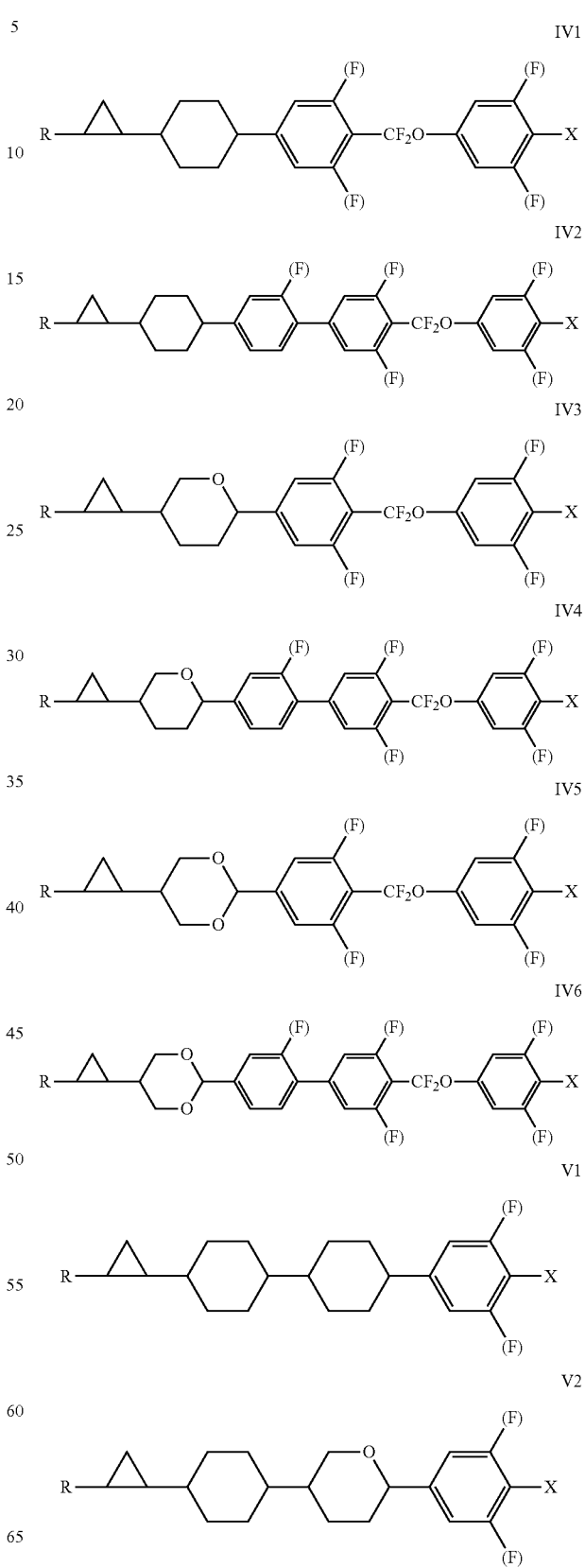

V3
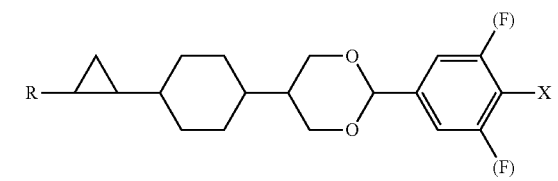

V4
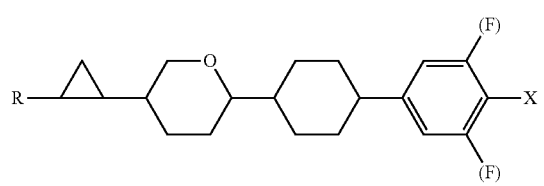

V5
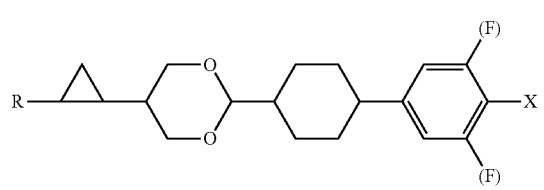

V6
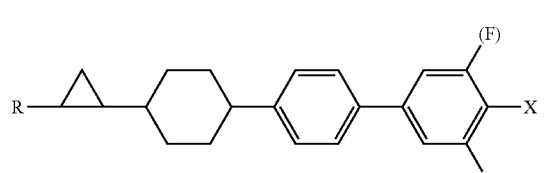

V7
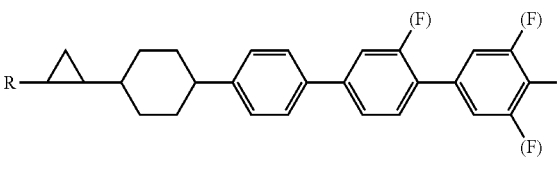

V8
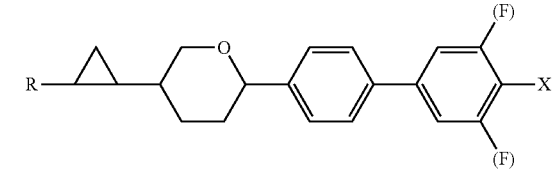

V9
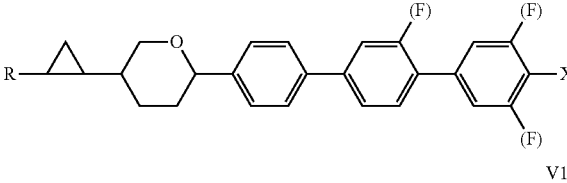

V10
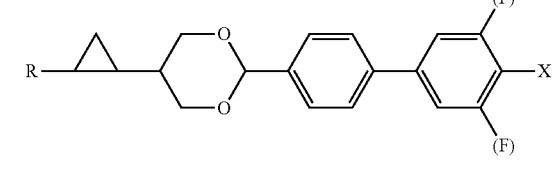

V11
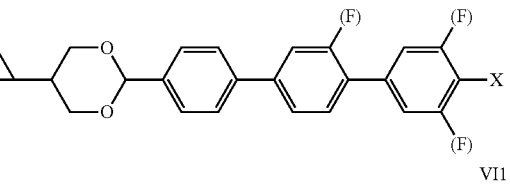

VI1
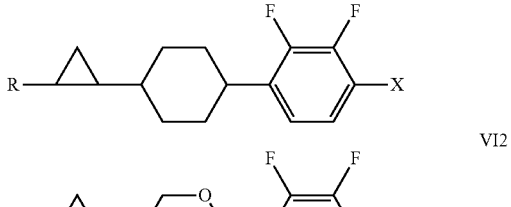

VI2
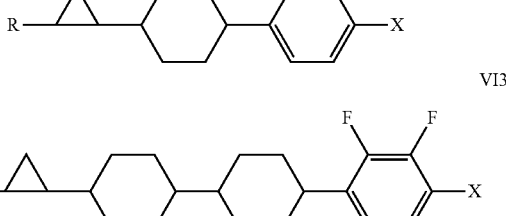

VI3
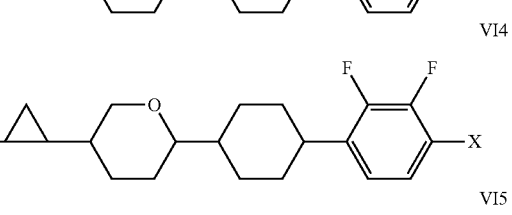

VI4
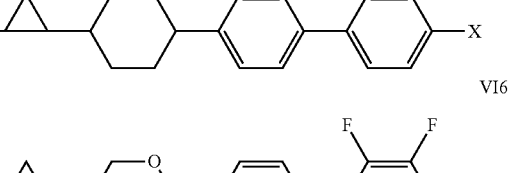

VI5
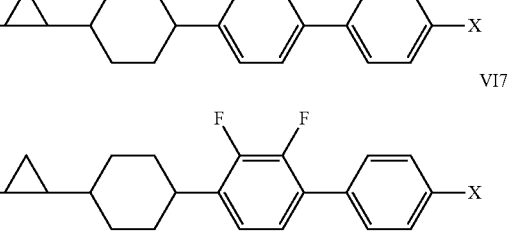

VI6
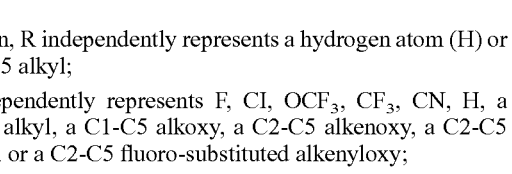

VI7
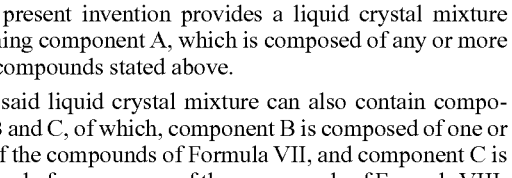

wherein, R independently represents a hydrogen atom (H) or a C1-C5 alkyl;

X independently represents F, Cl, OCF$_3$, CF$_3$, CN, H, a C1-C5 alkyl, a C1-C5 alkoxy, a C2-C5 alkenoxy, a C2-C5 alkenyl or a C2-C5 fluoro-substituted alkenyloxy;

(F) independently represents F or H.

The present invention provides a liquid crystal mixture containing component A, which is composed of any or more of the compounds stated above.

The said liquid crystal mixture can also contain components B and C, of which, component B is composed of one or more of the compounds of Formula VII, and component C is composed of one or more of the compounds of Formula VIII:

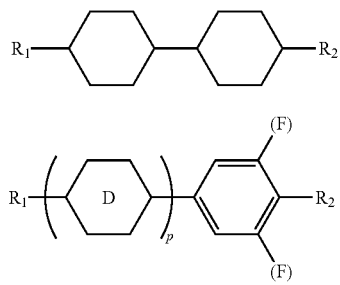

VII

VIII

In the Formula VII and Formula VIII, $R_1$ and $R_2$ each independently represent a C1-C6 alkyl or a C2-C6 alkenyl;

$R_3$ represents H, F, a C2-C6 alkenoxy or a C2-C6 fluoro-substituted alkenyloxy;

represents one or more of -1,4-cyclohexylidene, -1,4-phenylene and fluoro-1,4-phenylene;

p represents 2 or 3;

(F) independently represents H or F.

The mass ratio of the said component A, B and C is preferably 1-40:5-50:5-80, and is more preferably 10-35:15-45:25-75.

The said one or more of the compounds of Formula VII are preferably one or more of the compounds of the following structural formulas:

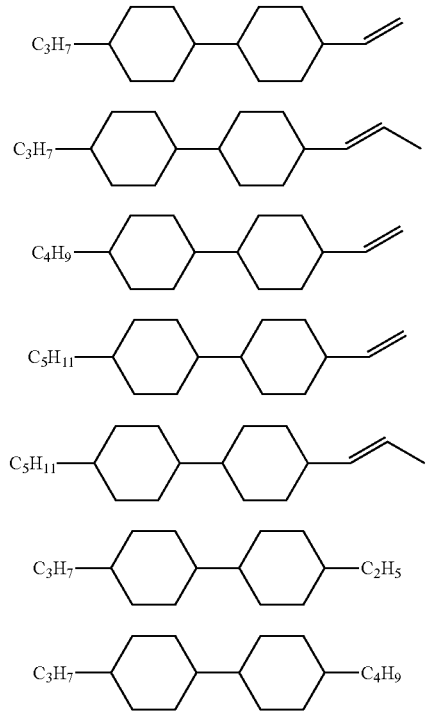

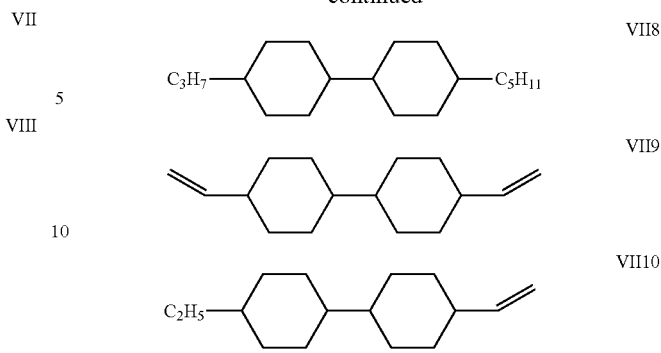

The mass fraction of the compound of Formula VII in the liquid crystal composition is preferably 5-55, and more preferably 20-45, and due to its low rotary viscosity (γ1), such compound can reduce the rotary viscosity (γ1) of the liquid crystal composition if it is used for liquid crystal composition, and the rotary viscosity (γ1) of the liquid crystal composition will drop as the volume of addition of compound of Formula VII increases, besides, other parameters will also be affected by that.

The said one or more of the compounds of Formula VIII are preferably one or more of the compounds of the following Formulas (VIII1-VIII12):

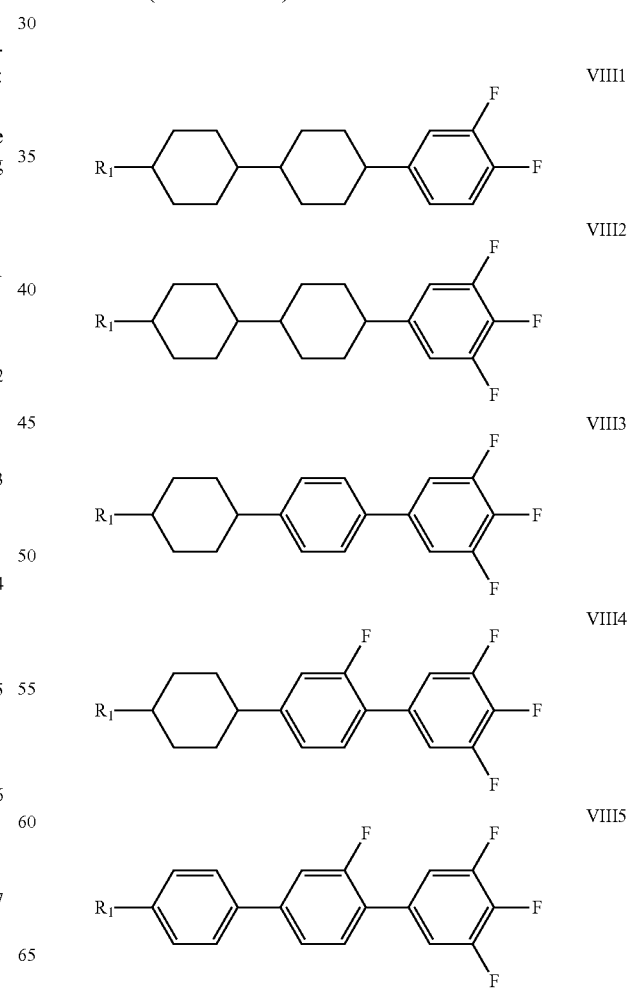

-continued

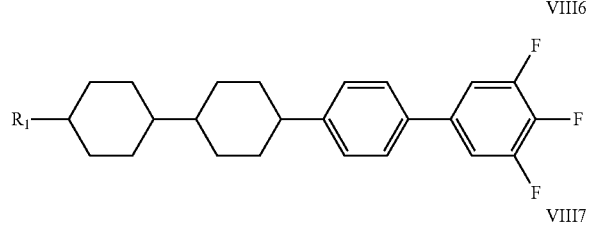

VIII6

VIII7

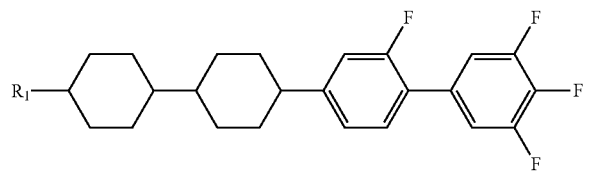

VIII8

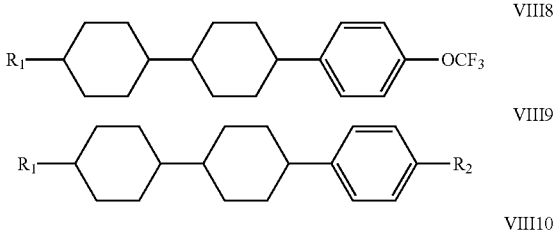

VIII9

VIII10

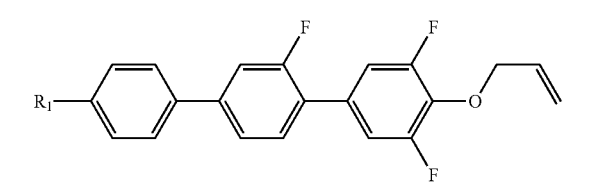

VIII11

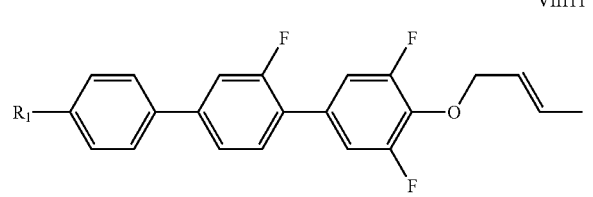

VIII12

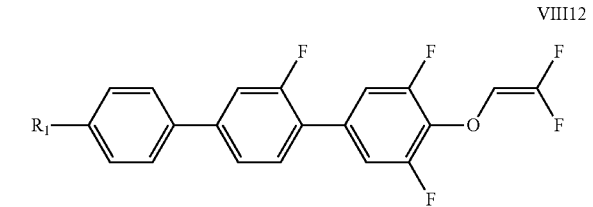

In the Formula VIII1-VII12, $R_1$ and $R_2$ each independently represent a C1-C6 alkyl or C2-C6 alkenyl.

The liquid crystal compositions of the present invention are prepared by several compounds, and are generally produced from the mixing of liquid crystal monomers of 5-20 types. Owing to their different performance parameters, each monomer will play a different role in the mixture system, and the formula engineer can, through preferring different monomer and optimizing the proportion of different monomers, adjust all performance parameters of the mixed liquid crystal such as dielectric anisotropy ($\Delta\in$), optical anisotropy ($\Delta n$), nematic phase of wide temperature range (crystallization point and clearing point (CP)), low rotary viscosity ($\gamma_1$), elastic constant (K), cryogenic property, transmittance and other parameters, to adapt to the requirements of the display devices and the collocability with PI and sealent used by the display devices, so as to avoid some poor display.

The liquid crystal mixtures as involved in the present invention have wide scope of dielectric anisotropy ($\Delta\in$) (the value of which can be set between 0.060-0.350), good low temperature miscibility with other liquid crystals, a low rotary viscosity ($\gamma_1$) (lower than 150 mPa·s, or even at 60mPa·s), high clearing point (CP) (any value from 60° C. to 120° C. is attainable), and good UV stability and high temperature stability, and therefore can be used for different display modes and are able to satisfy the requirements for liquid crystal performance under different display modes in terms of thickness of liquid crystal cell, response time, driving voltage and low viscosity.

The present invention is directed not only to the liquid crystal compositions of the liquid crystal compounds of Formula I, but also to the liquid crystal display devices containing such liquid crystal compositions. The said display devices refer to VA display, IPS display, FFS display, TN display and STN display.

The VA display can be MVA, PVA, PSVA, UV²A; and IPS display includes positive and negative IPS display; FFS display includes positive and negative FFS display.

The liquid crystal compositions of the present invention may be added with levorotatory or dextrorotary chiral dopants to form a chiral nematic phase.

After exposure to high temperature, UV or visual light, the liquid crystal or the trace impurities therein can easily enter into the excited state or create free radicals, and since the chemical character of the excited state or free radicals is very active, it will be likely to lead to oxidation or other chemical reaction that will cause the decline in quality of the liquid crystal. Furthermore, the liquid crystal compounds of the present invention may be added in dopants of various properties during synthesis and use, and the content of dopants is preferably 0.01-1%, and such dopants are mainly antioxidants, ultraviolet absorbents and light stabilizers, which are used to improve the stability of liquid crystal, enhance quality and extend the service life of the mixed liquid crystal.

The antioxidants, ultraviolet absorbents and light stabilizers are preferably: UV-P,

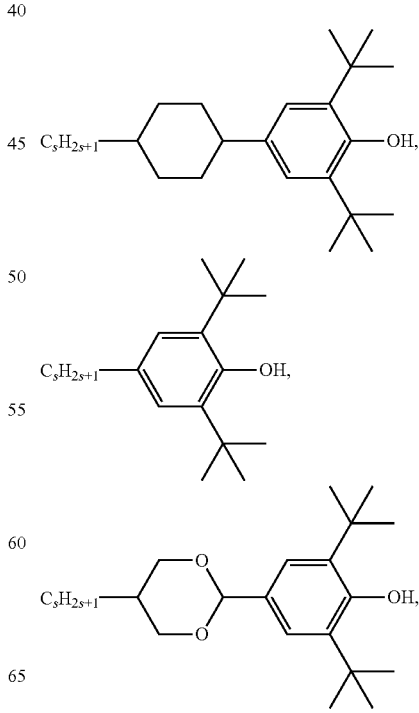

-continued

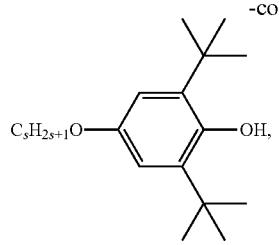

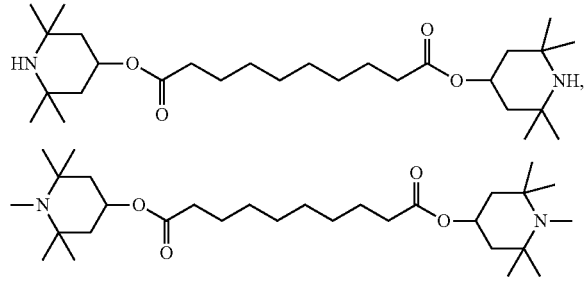

wherein, s is an integer selected from 1-10.

DETAILED DESCRIPTION OF THE INVENTION

Figure 1:
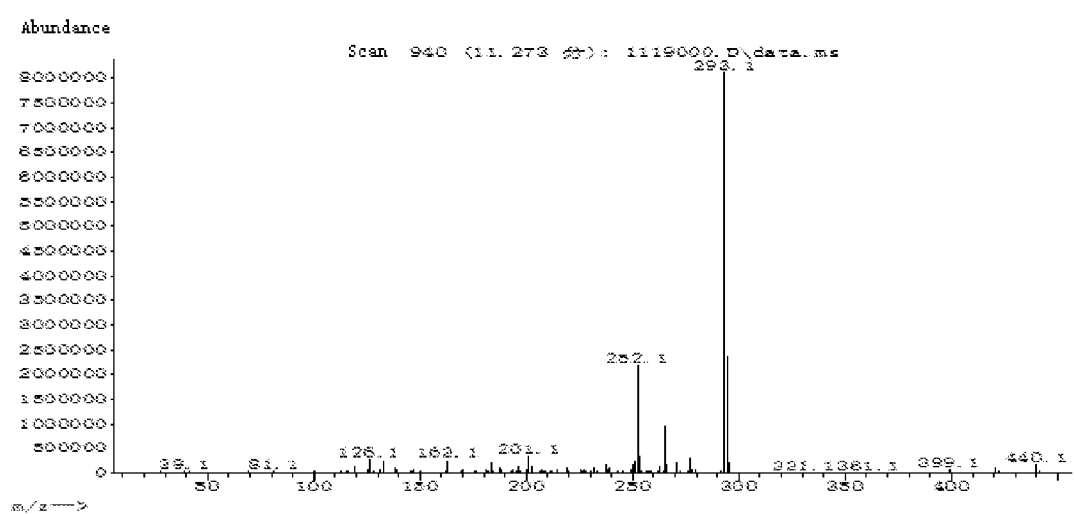
FIG. 1 is the mass spectrum of compound (1-b).

Embodiments of the present invention are described below. It is, however, expressly noted that the present invention is not limited to these embodiments. Unless otherwise stated, the methods are conventional methods, and the raw materials can be obtained from public domains and by commercial methods.

As used in the embodiments and examples, the specific meaning and test conditions of the symbols are as follows:

Cp: unit ° C., means the clearing point of liquid crystal.

S-N: unit ° C., means the melting point at which the liquid crystal changes from crystalline solid into nematic phase.

Δn: optical anisotropy, $\Delta n = n_o - n_e$, wherein $n_o$ is the refractive index of ordinary light, and $n_e$ is the refractive index of extraordinary light, and the test conditions are 589 nm, 25±0.5° C.

ΔE: dielectric anisotropy, $\Delta\varepsilon = \varepsilon_\parallel - \varepsilon_\perp$, wherein, $\varepsilon_\parallel$ is the dielectric constant parallel with the molecular axis, and $\varepsilon_\perp$ is the dielectric constant perpendicular to the molecular axis, and the test conditions are 25±0.5° C.; 1 KHz; HP4284A; and 5.2 micron TN L-box.

γ1: rotary viscosity, unit: mPa·s, and the test condition is 25±0.5° C.

VHR: voltage holding ratio (%), the test conditions are 20±2° C.,±5V voltage, 10 ms pulse width and 16.7 ms voltage holding time. The test equipment is the TOYO Model 6254 liquid crystal performance comprehensive tester.

The reaction process is usually monitored by the TLC, and the general post-processing at the end of reaction includes washing, extract, drying after combination of organic phase, solvent distillation under reduced pressure, and recrystallization and column chromatography. And it will be easy and obvious to those skilled in the art to carry out the present invention in accordance with the following description.

Route 1:

represents phenylene or fluoro-substituted phenylene, and n=1;

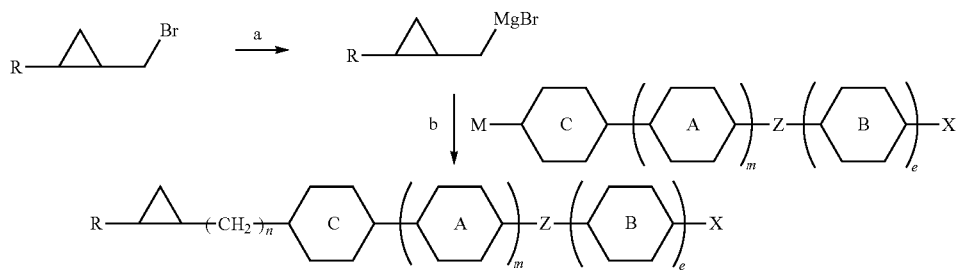

M represents Br2, I2;
a: Mg Et$_2$O
b: PdCl2 dppp Et$_2$O
Route 2:

represents phenylene or fluoro-substituted phenylene, and n=2;

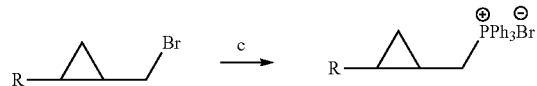

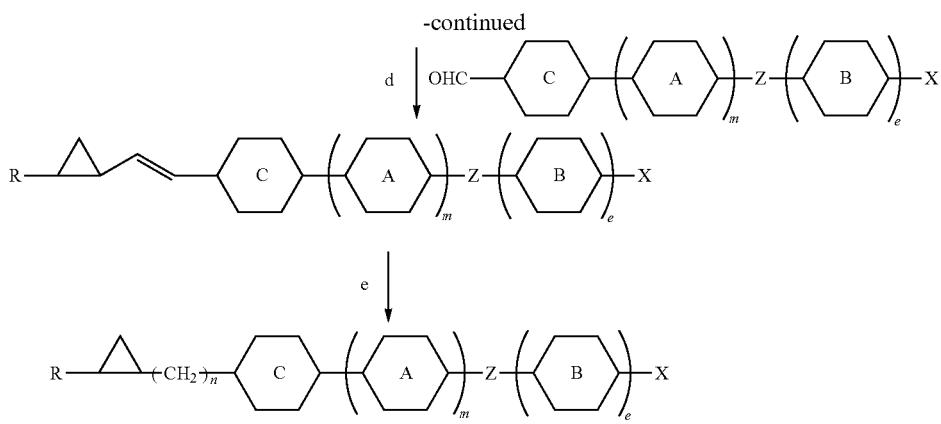

c: PPh3 DMF 100° C.
d: THF, potassium tert-butoxide, −5° C.
e: H2, ethanol Pd/C
Route 3:

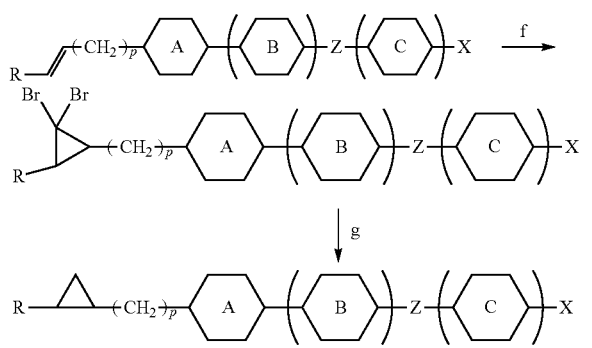

f: NaOH, Water, CHBr3, TBAB, EtOH reflux
g: Pd/C EtOH

Example 1

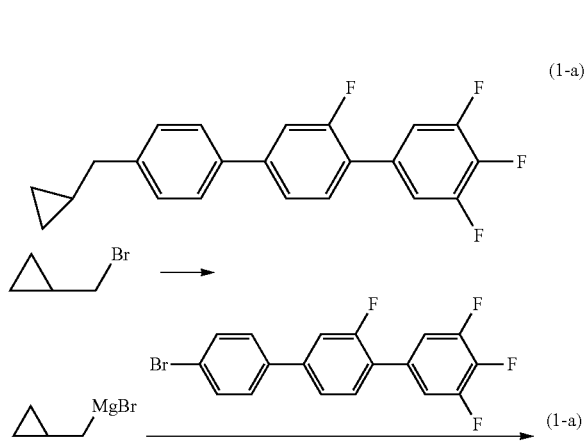

0.72 g (0.03 mol) metal Mg spalls were placed in the 100 ml three-necked flask with nitrogen charging in to replace air. 20 ml diethyl ether was added to cover the Mg spalls. The mixture was heated to reflux. 20 ml diethyl ether solution with 4.05 (0.03 mol) cyclopropylmethyl bromides was instilled, and the reaction was soon initiated. Keep the mixture microboiling until the instilment was finished. And the mixture should reflux for another 30 minutes after instilment.

7.62 g (0.02 mol) 4"-Bromo-2',3,4,5-PTFE-1,1';4',1"-terphenyl were placed in another 250 ml three-necked flask with nitrogen charging in to replace air. 30 ml diethyl ether was added to dissolve. 0.2 g PdCl2 dppp was added as catalyst, and controlled the temperature at 15±5° C. The said Grignard reagent was instilled, and refluxed for another 5 hours after instilment.

After regular post-processing, 3.27 g products (1-a) were gained, with Gc:99.92%.

With reference to the synthesis method set forth in Example 1, only replace part of the raw materials, the following compounds can be synthesized.

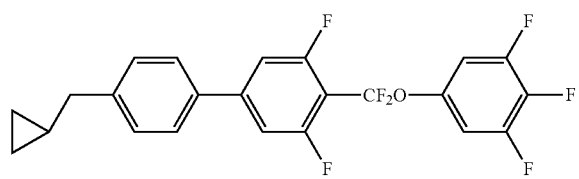

Figure 3:
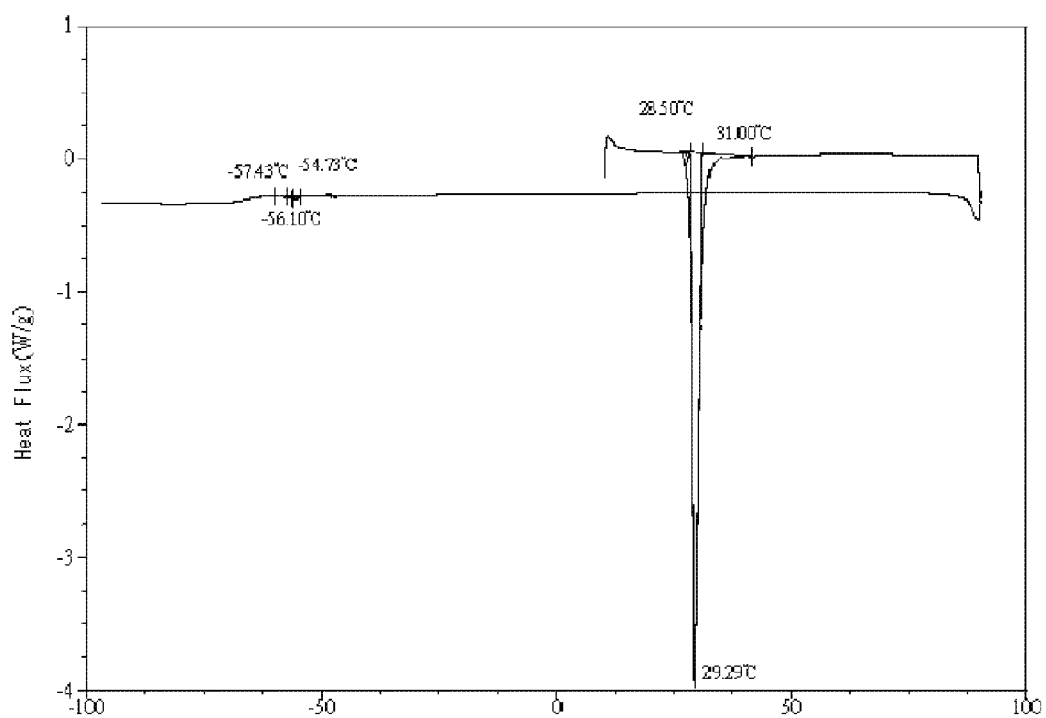
FIG. 3 is the DSC curve of compound (1-b).

Mp: 28.5° C., please see FIG. 1 for (1-b) MS spectrum and FIG. 3 for DSC curve.

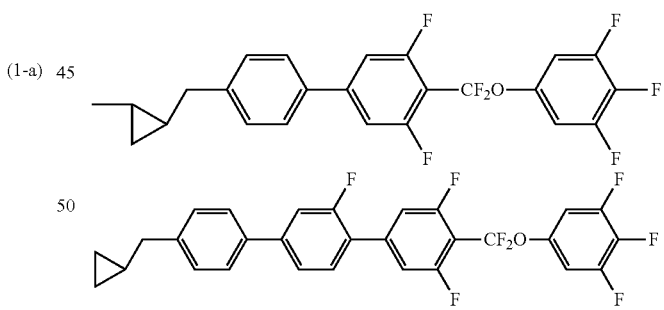

Δε[1 KHz, 20° C.]: 27.8
Δn[589 nm, 20° C.]: 0.198
Cp: 106° C.

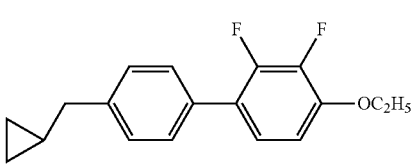 [SMILES: CCOc1ccc(-c2ccc(CC3CC3)cc2)c(F)c1F]

Example 2

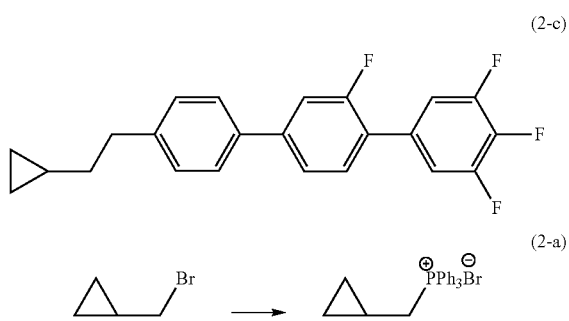

(2-c)

(2-a)

Step 1:

20 g (0.148 mol) cyclopropylmethyl bromide, 39.3 g (0.15 mol) triphenylphosphine and 30 ml DMF were placed in a 250 ml three-necked flask, and maintained the temperature at 100-110° C. for 6 hours, and then cooled to 50° C., and poured 200 ml ethyl acetate into the flask and stirred till the occurrence of a lot of white solid. After filtering, 34 g products of cyclopropyl methyl bromide triphenylphosphine salt (2-a) were obtained.

Step 2:

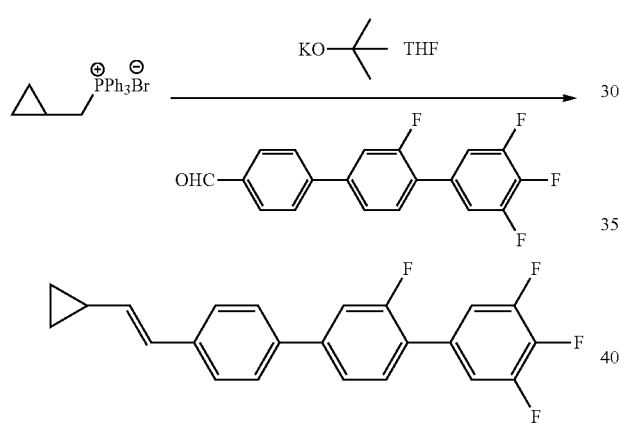

(2-b)

34 g (0.084 mol) cyclopropyl methyl bromide triphenylphosphine salt and 400 ml THF were placed into a 1 L three-necked flask, and charged nitrogen into the flask for protection, and then cooled to −10° C. Maintained the temperature and added in 11 g potassium tert-butoxide by stage, heated up to 0° C. to react for half an hour.

The resolution of 23.1 g (0.07 mol) 4″-Bromo-2′,3,4,5-PTFE-1,1′;4′,1″-terphenyl and 100 ml THF was instilled, and the temperature was controlled at 0-5° C. After 20 minutes, the instilment finished and the mixture was then allowed for natural temperature rise to room temperature to react for 1 hour.

After regular post-processing, 21.2 g products of (2-b) were obtained, with a reaction yield of 82% and Gc:99.6%.

Step 3:

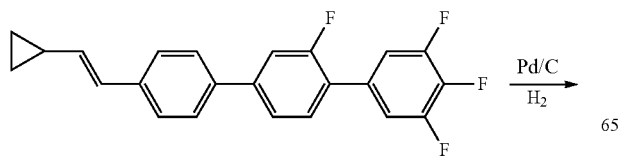

(2-c)

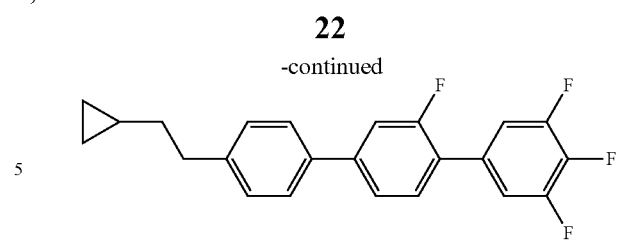

21.2 g (2-b), 1 g Pd/C, 200 ml ethanol and 50 ml methylbenzene were placed into a 500 ml three-necked flask, and conducted 4 hydrogen substitutions, and charged hydrogen at room temperature, reacted for 15 hours.

After products' Gc analysis, 3% products from ring-opening reaction of cyclopropyl were found, and after filtering catalyst and 4-5 recrystallization, and 15.6 g (2-c) were obtained with a reaction yield of 73.5% and Gc:99.85%.

Figure 2:
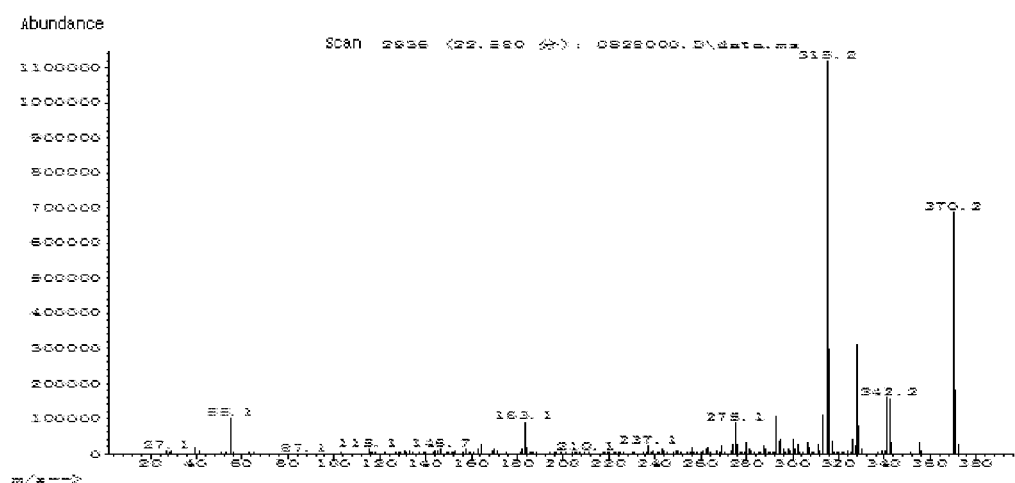
FIG. 2 is the mass spectrum of compound (2-c).

Please see FIG. 2 for MS spectrum.

With reference to the synthesis method set forth in Example 2, only replace part of the raw materials, the following compounds can be synthesized:

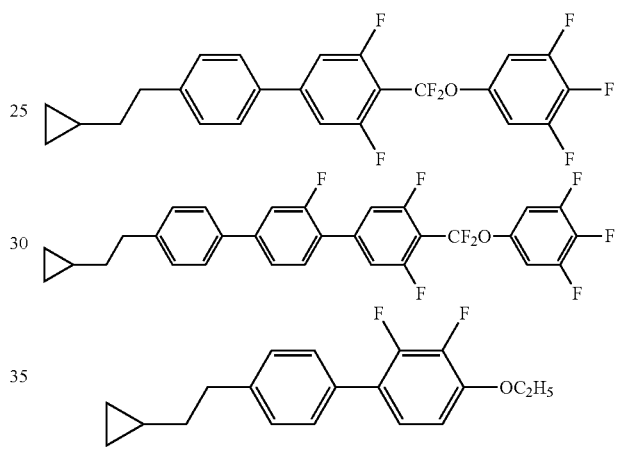

Example 3

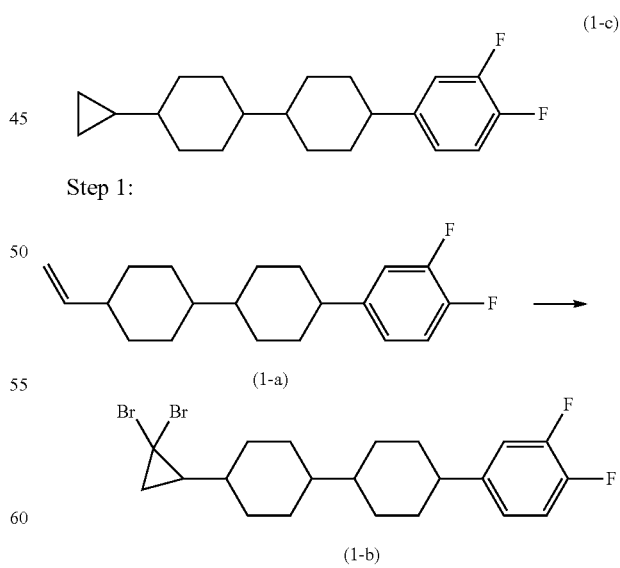

(1-c)

Step 1:

(1-a)

(1-b)

4.0 g (0.1 mol) NaOH, 4.0 g water, 0.01 g tetrabutylammonium bromide and 0.5 ml ethanol were placed into a 100 ml three-necked flask and stirred to dissolve. Added in 6.08 g (0.02 mol) (1-a) and 25 g bromoform and agitated and heated to reflux for complete reaction. After regular post-processing, 5.99 g (1-b) were obtained, with a reaction yield of 63%.

Step 2:

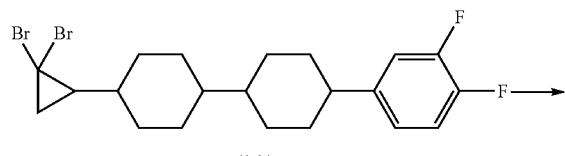

(1-b)

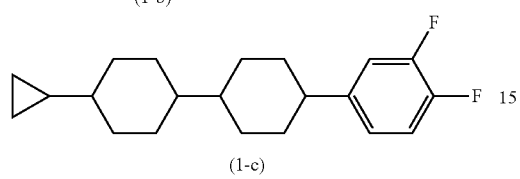

(1-c)

Dissolved 5.99 g (0.0126 mol) (1-b) in 100 ml ethanol and then added in 0.6 g Pd/C and 0.013 mol sodium acetate, and stirred at room temperature. Let the mixture react for 14 hours. After regular post-processing, 3.0 g (1-c) were obtained with a reaction yield of 75%.

Example 4

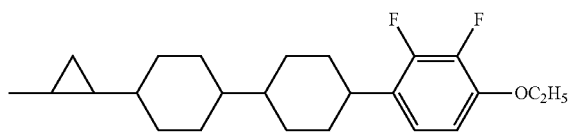

(2-a)

Used

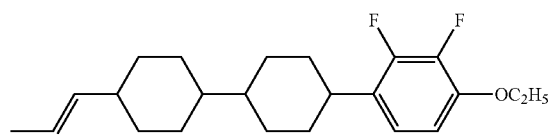 [SMILES: C/C=C/C1CCC(C2CCC(c3ccc(OCC)c(F)c3F)CC2)CC1]

to replace (1-a) in Example 1, and the synthesis process and method is same as that of Example 1, and with slight change known to those skilled in the art, the target compound (2-a) can be synthesized.

With reference to the synthesis method set forth in Example 3, only replace part of the raw materials, the following compounds can be synthesized:

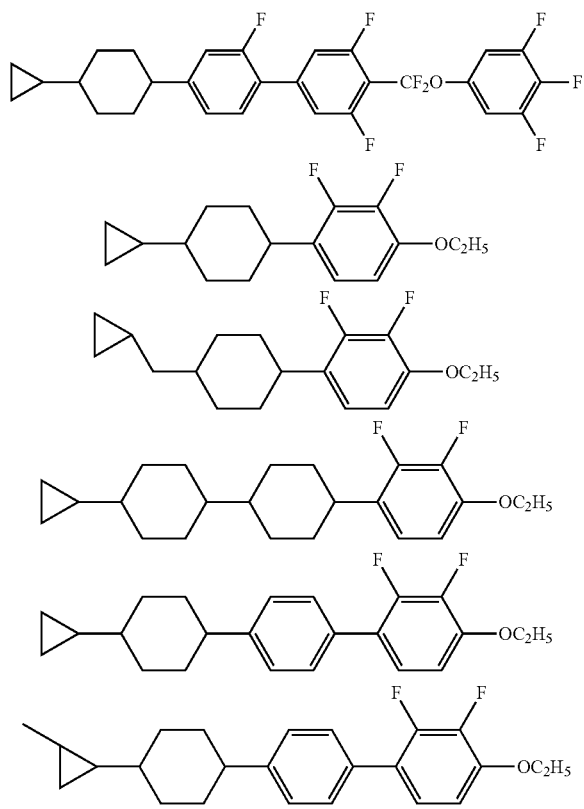

Example 5

A liquid crystal composition.

| Liquid crystal compound | Mass percentage (%) |
|---|---|
| $C_3H_7$-⬡-⬡-CH=CH$_2$ | 28 |
| $C_3H_7$-⬡-⬡-CH=CH-CH$_3$ | 10 |
| $C_2H_5$-⌬-⌬(F,F)-⌬(F,F,F) | 8 |

-continued

| Liquid crystal compound | Mass percentage (%) |
|---|---|
| CH₃-⟨phenyl⟩-⟨cyclohexyl⟩-⟨cyclohexyl⟩-CH₂CH₂CH=CH₂ | 8 |
| C₂H₅-⟨phenyl⟩-⟨phenyl(F)⟩-⟨phenyl⟩-C₃H₇ | 8 |
| C₃H₇-⟨cyclohexyl⟩-⟨phenyl⟩-⟨phenyl⟩-⟨cyclohexyl⟩-C₃H₇ | 8 |
| cyclopropyl-CH₂-⟨phenyl⟩-⟨phenyl(F,F)⟩-⟨phenyl(F,F)⟩ | 10 |
| cyclopropyl-CH₂-⟨phenyl⟩-⟨phenyl(F,F)⟩-CF₂O-⟨phenyl(F,F,F)⟩ | 20 |

Δε[1 KHz, 20° C.]: 9.10
Δn[589 nm, 20° C.]: 0.122
Cp: 76° C.
γ₁[25° C.]: 68 mPa·s

This liquid crystal composition has an appropriate Δε, a large Δn, a low γ₁ and an appropriate Cp, and fits for liquid crystal materials for TN, IPS, FFS-TFT display with rapid response and low cell gap.

The mixture was kept at −30° C. for 400 hours, and the compounds of Formula I crystallized.

Example 6

A liquid crystal composition.

| Liquid crystal compound | Mass percentage (%) |
|---|---|
| C₃H₇-⟨cyclohexyl⟩-⟨cyclohexyl⟩-CH=CH₂ | 30 |
| C₃H₇-⟨cyclohexyl⟩-⟨cyclohexyl⟩-CH=CH-CH₃ | 10 |
| C₂H₅-⟨phenyl⟩-⟨phenyl(F)⟩-⟨phenyl(F,F)⟩-F | 8 |
| C₂H₅-⟨phenyl⟩-⟨phenyl(F)⟩-⟨phenyl⟩-C₃H₇ | 8 |

-continued

| Liquid crystal compound | Mass percentage (%) |
|---|---|
| 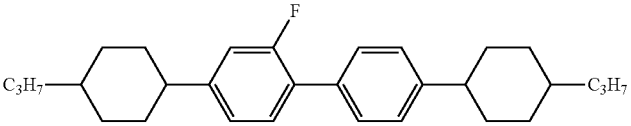 | 8 |
| 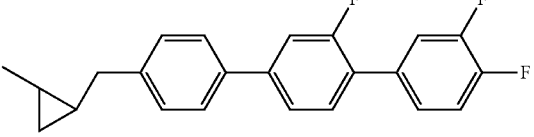 | 10 |
| 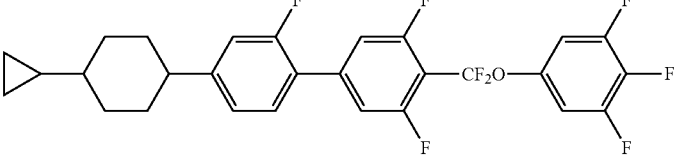 | 12 |
| 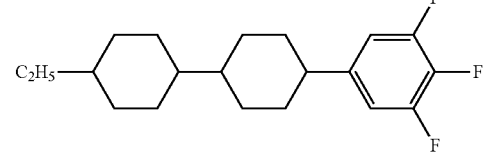 | 14 |

Δε[1 KHz, 20° C.]: 7.8
Δn[589 nm, 20° C.]: 0.113
Cp: 92° C.
γ$_1$[25° C.]: 85 mPa · s

This liquid crystal composition has an appropriate Δ∈, an appropriate Δn, a low γ$_1$ and a high Cp, and fits for liquid crystal materials for TN, IPS, FFS-TFT display with rapid response.

The mixture was kept at −30° C. for 400 hours, and the compounds of Formula I crystallized.

Example 7

A liquid crystal composition.

| Liquid crystal compound | Mass percentage (%) |
|---|---|
| 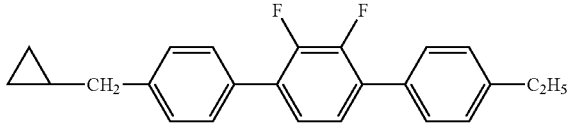 [SMILES: CCc1ccc(-c2ccc(-c3ccc(CC4CC4)cc3)c(F)c2F)cc1] | 16 |
| 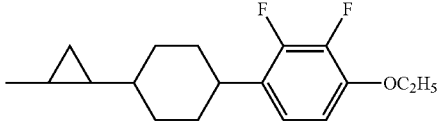 [SMILES: CCOc1ccc(C2CCC(C3CC3C)CC2)c(F)c1F] | 16 |
| 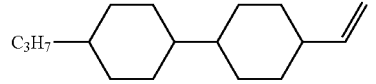 | 4 |
| 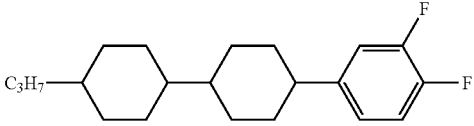 | 8 |

| Liquid crystal compound | Mass percentage (%) |
|---|---|
| 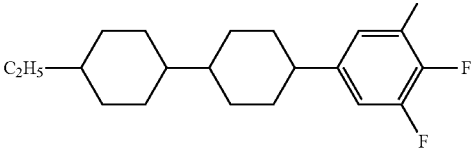 | 16 |
| 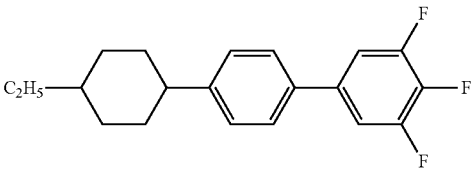 [SMILES: CCC1CCC(c2ccc(-c3cc(F)c(F)c(F)c3)cc2)CC1] | 20 |
| 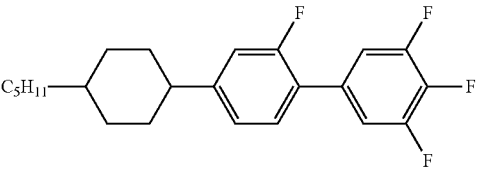 | 20 |
Δε[1 KHz, 20° C.]: 5.7
Δn[589 nm, 20° C.]: 0.0946
Cp: 63.9° C.
γ₁[25° C.]: 142 mPa·s
Example 8
A liquid crystal composition.
| Liquid crystal compound | Mass percentage (%) |
|---|---|
| 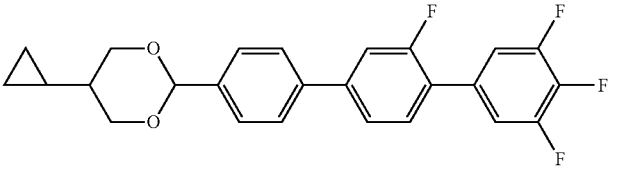 [SMILES: Fc1cc(-c2ccc(C3OCC(C4CC4)CO3)cc2)ccc1-c1cc(F)c(F)c(F)c1] | 1 |
| 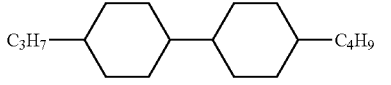 | 8 |
| 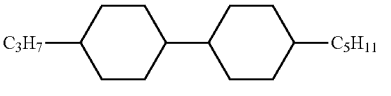 | 15 |
| 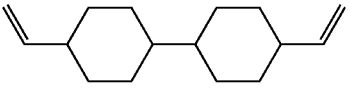 | 15 |
| 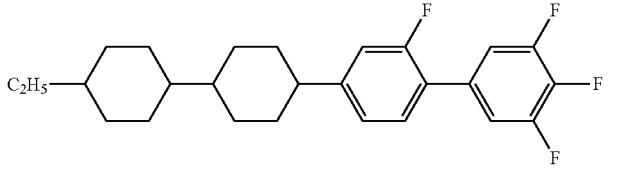 | 4 |
| 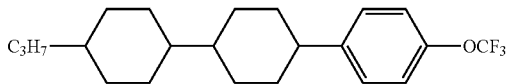 | 10 |

| Liquid crystal compound | Mass percentage (%) |
|---|---|
|  | 2 |
| 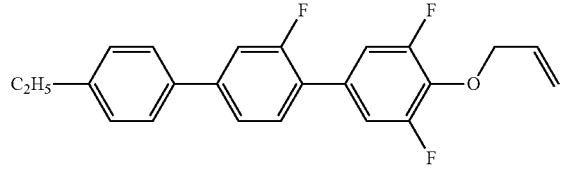 [SMILES: C=CCOc1c(F)cc(-c2ccc(-c3ccc(CC)cc3)cc2F)cc1F] | 23 |
| 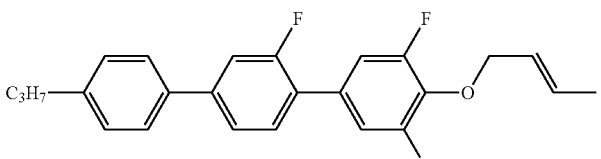 | 22 |
Δε[1 KHz, 20° C.]: 2.6
Δn[589 nm, 20° C.]: 0.141
Cp: 90° C.
γ$_1$[25° C.]: 74 mPa·s
Example 9
A liquid crystal composition.
| Liquid crystal compound | Mass percentage (%) |
|---|---|
| 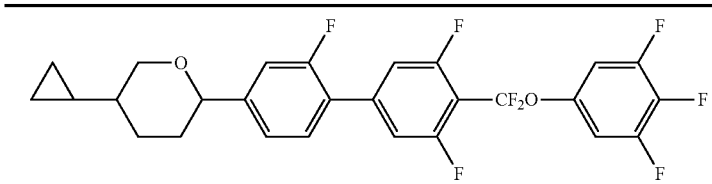 | 10 |
| 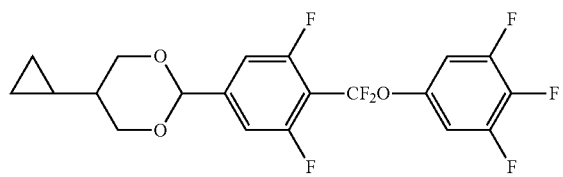 | 20 |
| 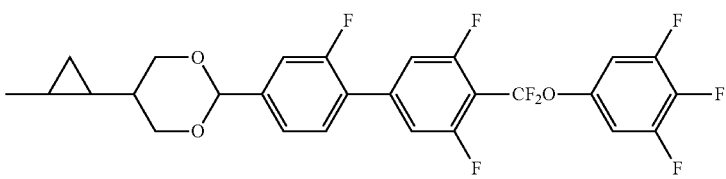 | 10 |
| 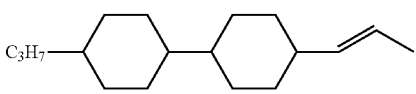 | 5 |
| 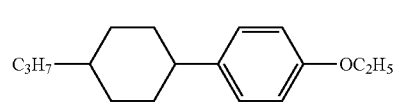 | 20 |
| 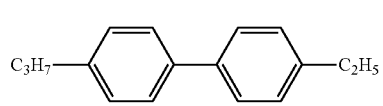 | 10 |

-continued
| Liquid crystal compound | Mass percentage (%) |
|---|---|
| 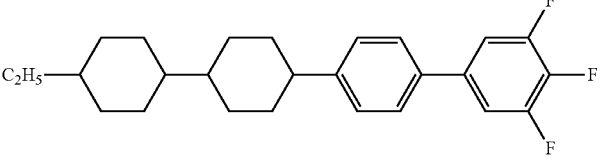 | 5 |
| 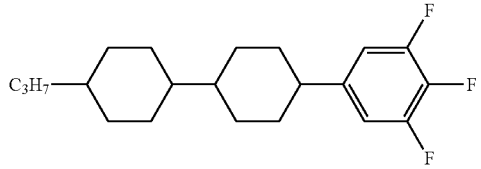 | 20 |
Δε[1 KHz, 20° C.]: 12.5
Δn[589 nm, 20° C.]: 0.138
Cp: 128° C.
γ$_1$[25° C.]: 174 mPa · s
Example 10
A liquid crystal composition.
| Liquid crystal compound | Mass percentage (%) |
|---|---|
| 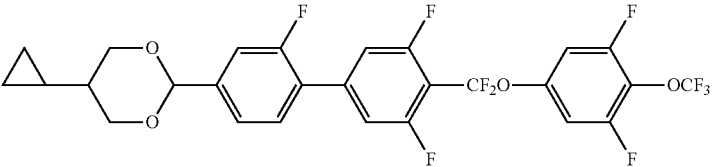 | 2 |
| 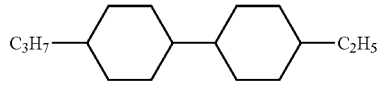 | 10 |
| 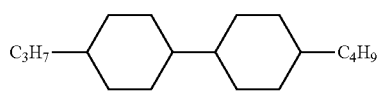 | 10 |
| 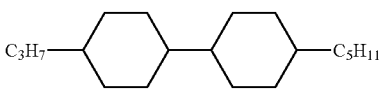 | 10 |
| 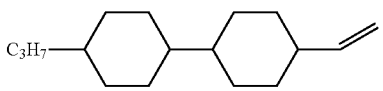 | 20 |
| 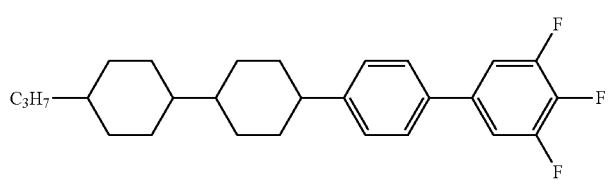 | 5 |

-continued
| Liquid crystal compound | Mass percentage (%) |
|---|---|
| 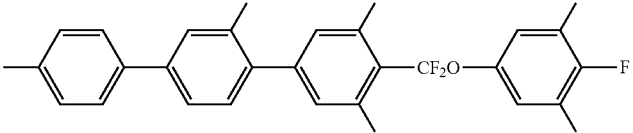 | 12 |
| 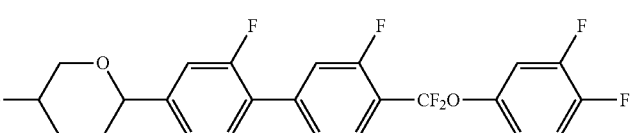 | 8 |
| 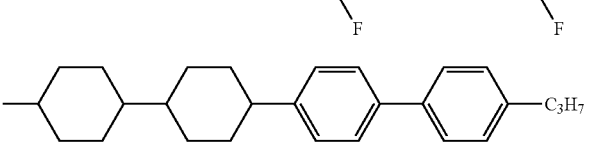 | 8 |
| 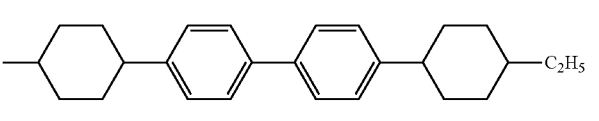 | 7 |
| 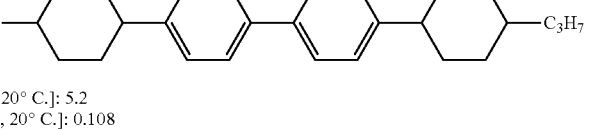 | 8 |
Δε[1 KHz, 20° C.]: 5.2
Δn[589 nm, 20° C.]: 0.108
Cp: 143° C.
$\gamma_1$[25° C.]: 143 mPa·s
Example 11
A liquid crystal composition.
| Liquid crystal compound | Mass percentage (%) |
|---|---|
| 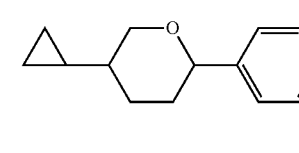 | 3 |
| 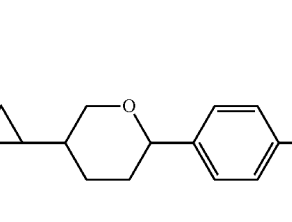 | 5 |
| 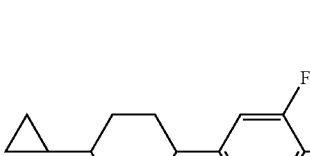 | 13 |

-continued

| Liquid crystal compound | Mass percentage (%) |
|---|---|
| [structure: cyclopropyl-cyclohexyl-(2-F)phenyl-(3,5-F)phenyl-CF2O-(3,4,5-F)phenyl] | 11 |
| [structure: cyclopropyl-CH2-phenyl-(3,6-F)phenyl-(3,4,5-F)phenyl] | 10 |
| [structure: C5H11-cyclohexyl-cyclohexyl-CH=CH-CH3] | 5 |
| [structure: C3H7-cyclohexyl-cyclohexyl-C2H5] | 7 |
| [structure: C3H7-cyclohexyl-cyclohexyl-C4H9] | 21 |
| [structure: C3H7-cyclohexyl-cyclohexyl-C5H11] | 20 |
| [structure: C2H5-phenyl-(2-F)phenyl-(3,5-F)phenyl-O-allyl] | 5 |

Δε[1 KHz, 20° C.]: 6.6
Δn[589 nm, 20° C.]: 0.102
Cp: 87° C.
$\gamma_1$[25° C.]: 91 mPa·s

Example 12

A liquid crystal composition.

| Liquid crystal compound | Mass percentage (%) |
|---|---|
| [structure: cyclopropyl-dioxane-phenyl-(2-F)phenyl-(3,4,5-F)phenyl] | 1 |
| [structure: C3H7-cyclohexyl-cyclohexyl-CH=CH2] | 2 |

-continued
| Liquid crystal compound | Mass percentage (%) |
|---|---|
| 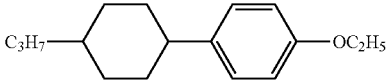 C₃H₇—⬡—⌬—OC₂H₅ | 2 |
| 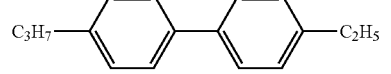 C₃H₇—⌬—⌬—C₂H₅ | 2 |
| 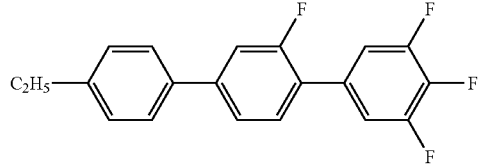 C₂H₅—⌬—⌬(F)—⌬(F,F,F) | 12 |
| 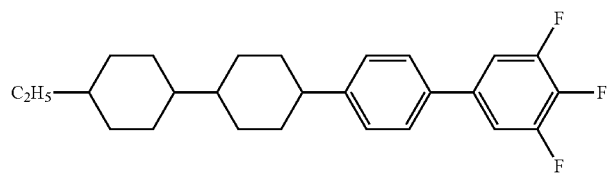 C₂H₅—⬡—⬡—⌬—⌬(F,F,F) | 12 |
| 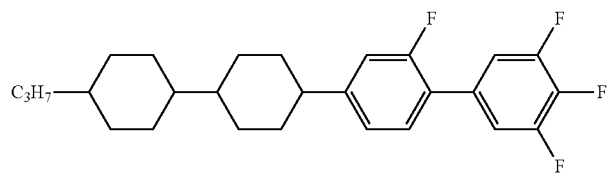 C₃H₇—⬡—⬡—⌬(F)—⌬(F,F,F) | 35 |
|  C₂H₅—⬡—⬡—⌬—OCF₃ | 17 |
|  C₂H₅—⬡—⬡—⌬—C₃H₅ | 8 |
| 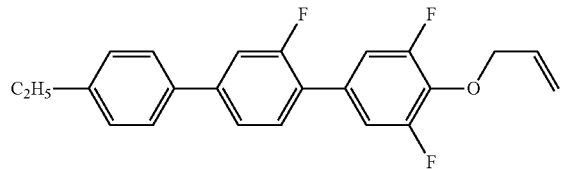 C₂H₅—⌬—⌬(F)—⌬(F,F)—O—allyl | 9 |
Δε[1 KHz, 20° C.]: 10.5  
Δn[589 nm, 20° C.]: 0.150  
Cp: 148° C.  
γ₁[25° C.]: 267 mPa · s
Example 13
A liquid crystal composition.
| Liquid crystal compound | Mass percentage (%) |
|---|---|
| 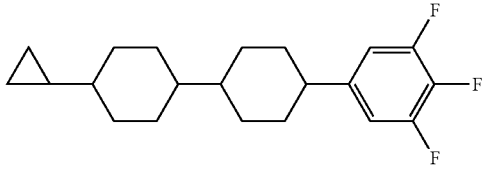 [SMILES: Fc1cc(C2CCC(C3CCC(C4CC4)CC3)CC2)cc(F)c1F] | 8 |

-continued
| Liquid crystal compound | Mass percentage (%) |
|---|---|
| 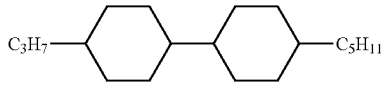 | 15 |
| 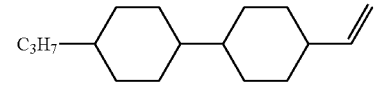 | 19 |
| 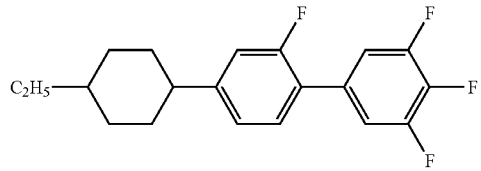 | 19 |
| 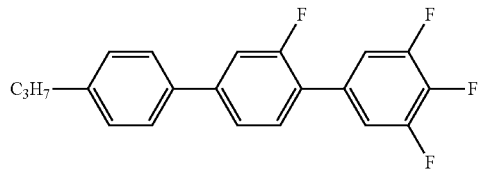 | 20 |
| 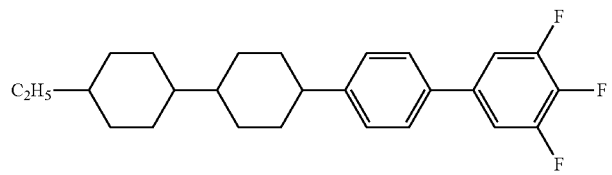 | 19 |
Δε[1 KHz, 20° C.]: 9.6
Δn[589 nm, 20° C.]: 0.112
Cp: 80° C.
γ₁[25° C.]: 92 mPa·s
Example 14
A liquid crystal composition.
| Liquid crystal compound | Mass percentage (%) |
|---|---|
| 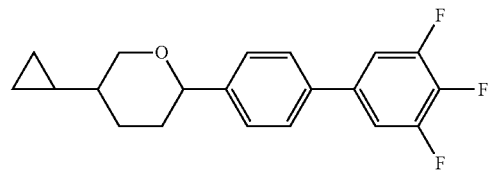 [SMILES: Fc1cc(-c2ccc(C3CCC(C4CC4)CO3)cc2)cc(F)c1F] | 1 |
| 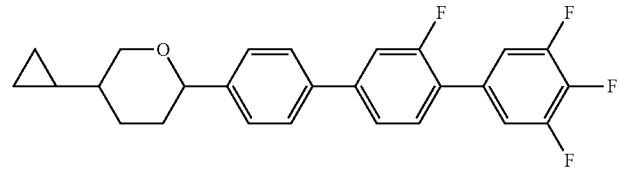 [SMILES: Fc1cc(-c2ccc(C3CCC(C4CC4)CO3)cc2)ccc1-c1cc(F)c(F)c(F)c1] | 5 |
| 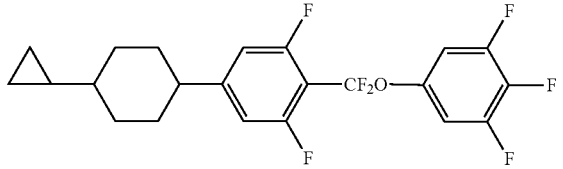 | 15 |

| Liquid crystal compound | Mass percentage (%) |
|---|---|
| 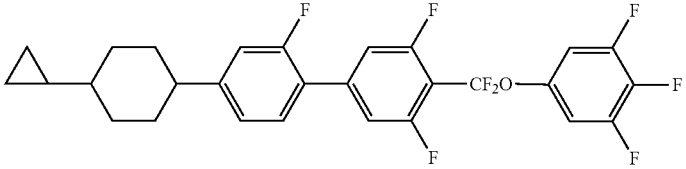 | 11 |
| 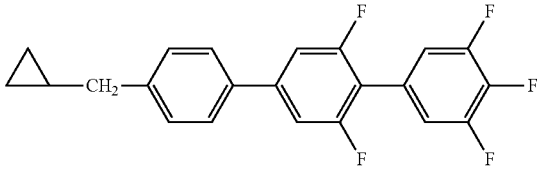 [SMILES: Fc1cc(-c2c(F)cc(-c3ccc(CC4CC4)cc3)cc2F)cc(F)c1F] | 5 |
| C₃H₇—⬡—⬡—C₄H₉ | 18 |
| C₃H₇—⬡—⬡—C₅H₁₁ | 20 |
| 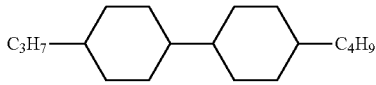 | 25 |
Δε[1 KHz, 20° C.]: 7.3
Δn[589 nm, 20° C.]: 0.137
Cp: 94° C.
γ₁[25° C.]: 91 mPa·s
Example 15
A liquid crystal composition.
| Liquid crystal compound | Mass percentage (%) |
|---|---|
| 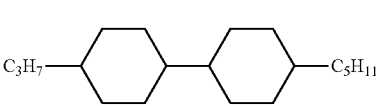 | 4 |
| 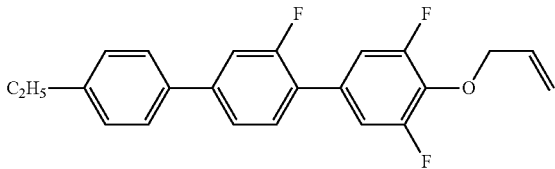 | 8 |
| 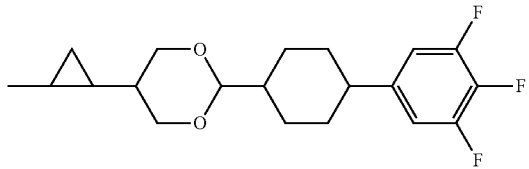 [SMILES: CC1CC1C1COC(C2CCC(c3cc(F)c(F)c(F)c3)CC2)OC1] | 8 |

-continued

| Liquid crystal compound | Mass percentage (%) |
|---|---|
| cyclopropyl-Cy-Ph(2,3-F)-OC₂H₅ | 8 |
| C₃H₇-Cy-Cy-CH=CH₂ | 6 |
| C₃H₇-Cy-Cy-CH=CH-CH₃ | 6 |
| C₂H₅-Cy-Cy-Ph-Ph(3,4,5-F) | 2 |
| C₃H₇-Cy-Cy-Ph(2-F)-Ph(3,4,5-F) | 2 |
| C₂H₅-Cy-Cy-Ph-OCF₃ | 16 |
| C₂H₅-Cy-Cy-Ph-C₃H₇ | 8 |
| C₃H₇-Ph-Ph(2-F)-Ph(3,5-F)-O-CH₂-CH=CH-CH₃ | 28 |
| C₂H₅-Ph-Ph(2-F)-Ph(3,5-F)-O-CF=CF₂ | 4 |

Δε[1 KHz, 20° C.]: 4.8
Δn[589 nm, 20° C.]: 0.140
Cp: 102° C.
γ₁[25° C.]: 62 mPa·s

Example 16
A liquid crystal composition.
| Liquid crystal compound | Mass percentage (%) |
|---|---|
| 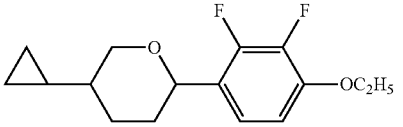 [SMILES: CCOc1ccc(C2CCC(C3CC3)CO2)c(F)c1F] | 10 |
| 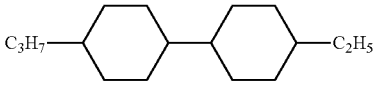 | 5 |
| 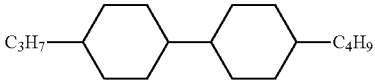 | 20 |
| 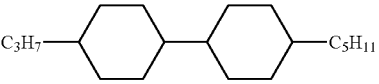 | 20 |
|  | 11 |
|  | 5 |
| 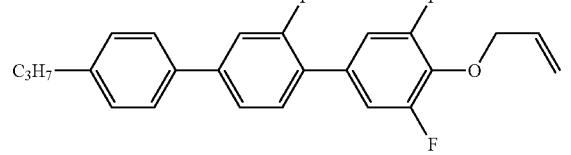 | 9 |
| 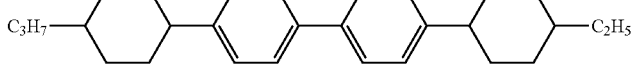 | 5 |
| 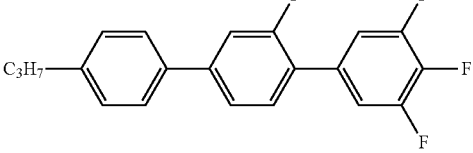 | 15 |
Δε[1 KHz, 20° C.]: 4.4
Δn[589 nm, 20° C.]: 0.083
Cp: 81° C.
$\gamma_1$[25° C.]: 62 mPa·s
Example 17
A liquid crystal composition.
| Liquid crystal compound | Mass percentage (%) |
|---|---|
| 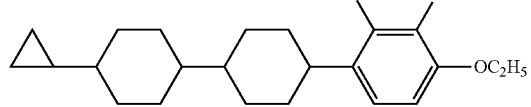 | 15 |

-continued

| Liquid crystal compound | Mass percentage (%) |
|---|---|
| [cyclopropyl-tetrahydropyran-cyclohexyl-(2,3-difluoro-4-ethoxy)phenyl] | 5 |
| C₃H₇-cyclohexyl-cyclohexyl-C₂H₅ | 1 |
| C₃H₇-cyclohexyl-cyclohexyl-CH=CH₂ | 11 |
| C₃H₇-cyclohexyl-cyclohexyl-CH=CH-CH₃ | 15 |
| C₂H₅-cyclohexyl-cyclohexyl-CH=CH₂ | 18 |
| C₂H₅-cyclohexyl-cyclohexyl-phenyl-(3,4,5-trifluoro)phenyl | 10 |
| C₃H₇-cyclohexyl-cyclohexyl-(2-fluoro)phenyl-(3,4,5-trifluoro)phenyl | 15 |

Δε[1 KHz, 20° C.]: 4.5
Δn[589 nm, 20° C.]: 0.095
Cp: 110° C.
γ₁[25° C.]: 156 mPa·s

Example 18

A liquid crystal composition.

| Liquid crystal compound | Mass percentage (%) |
|---|---|
| [cyclopropyl-tetrahydropyran-phenyl-(2-fluoro)phenyl-(3,4,5-trifluoro)phenyl] | 10 |
| C₃H₇-cyclohexyl-cyclohexyl-CH=CH-CH₃ | 2 |
| C₄H₉-cyclohexyl-cyclohexyl-CH=CH₂ | 13 |

-continued

| Liquid crystal compound | Mass percentage (%) |
|---|---|
| C₂H₅—[Cy]—[Cy]—[Ph(F,F)] (3,4-difluoro) | 10 |
| C₃H₇—[Cy]—[Cy]—[Ph]—[Ph(F,F,F)] (3,4,5-trifluoro) | 15 |
| C₂H₅—[Cy]—[Cy]—[Ph]—C₃H₇ | 20 |
| C₂H₅—[Ph]—[Ph(F)]—[Ph(F,F)]—O—CH₂—CH=CH₂ | 3 |
| C₃H₇—[Ph]—[Ph(F)]—[Ph(F,F)]—O—CH₂—CH=CH—CH₃ | 13 |
| C₂H₅—[Ph]—[Ph(F)]—[Ph(F,F)]—O—CF=CF₂ | 14 |

Δε[1 KHz, 20° C.]: 3.5
Δn[589 nm, 20° C.]: 0.154
Cp: 132° C.
γ₁[25° C.]: 211 mPa · s

Example 19

Liquid crystal mixture M containing (1-b).

| Liquid crystal compound | Mass percentage (%) |
|---|---|
| C₂H₅—[Cy]—[Cy]—C₃H₇ | 10 |
| C₂H₅—[Cy]—[Cy]—CH=CH₂ | 30 |
| C₂H₅—[Cy]—[Cy]—[Ph(F,F,F)] | 15 |

-continued

| Liquid crystal compound | Mass percentage (%) |
|---|---|
| 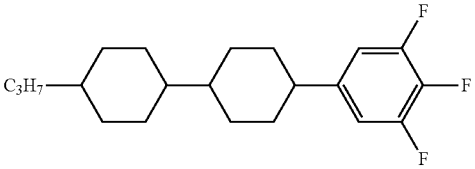 | 15 |
| 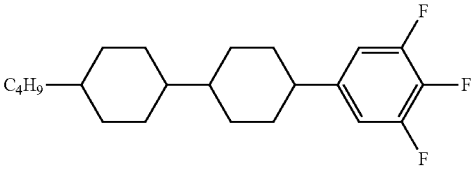 | 5 |
| 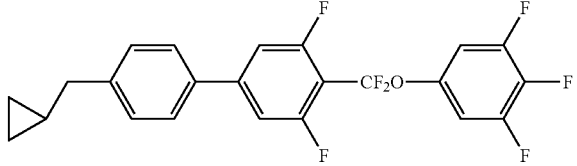 | 25 |

Δn[589 nm, 25° C.]: 0.0659
Δε[1 KHz, 25° C.]: 6.8
Cp: 50° C.
γ$_1$[25° C.]: 60.8 mPa·s

The mixture was kept at −30° C. for 400 hours, with no crystallization. Replaced (1-b) in the composition with

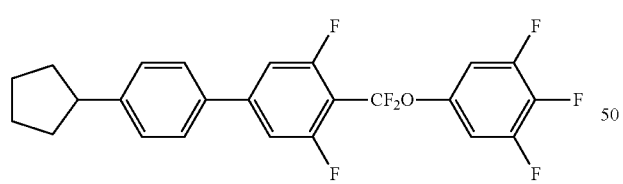

or

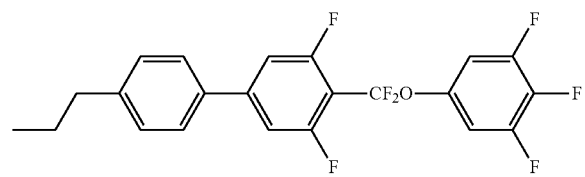

of equivalent weight ratio to form a new composition, and used the new composition to run a low temperature test. The new composition was kept at −30° C. for 400 hours, with crystallization. The crystallized monomer was

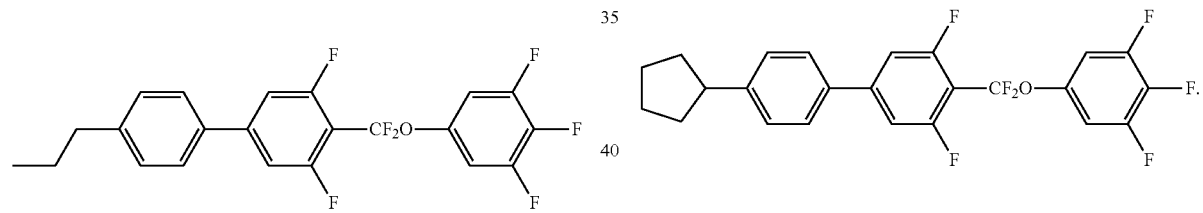

In the liquid crystal mixture M containing (1-b), other monomers other than (1-b) are common liquid crystal monomers for the time being, with stable chemical properties and good UV stability and high-temperature thermal stability.

After heating at 100° C. for 12 hours and UV 5000 mJ processing, the VHR data contrast of the liquid crystal mixture M before and after processing is as follows:

|  | VHR (%, 5.0 V, 16.61 ms) | VHR (%, 5.0 V, 166.7 ms) |
|---|---|---|
| Before Processing | 99.65 | 99.28 |
| After High-Temperature Processing | 99.59 | 99.20 |
| After UV Processing | 99.61 | 99.24 |

After the UV and high temperature processing, the VHR data of the liquid crystal only slightly declines and still maintains at an ideal level, which indicates a good stability.

The liquid crystal compounds of Formula I have good cryogenic property, good UV stability and high temperature thermal stability, and will have different Δn, Δε, Cp, γ1 properties when the values of R,

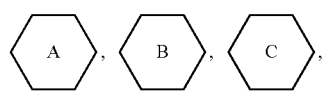

Z, X, m and n differ, and therefore have a wide range of application and can be used for preparing liquid crystal mixtures with different parameters.

What is claimed is:

1. A liquid crystal compound of Formula I:

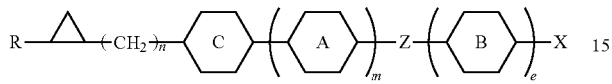

I wherein, R is H or a C1-C5 alkyl;

m, e, n each is 0, 1 or 2;

Z is a single bond, —CF$_2$O—, —CH$_2$CH$_2$—, —CH$_2$O—, —C≡C—, —OCH$_2$—, or —OCF$_2$—;

X is F, Cl, OCF$_3$, CF$_3$, CN, H, a C1-C5 alkyl, a C1-C5 alkoxy, a C2-C5 alkenoxy, a C2-C5 alkenyl, or a C2-C5 fluoro-substituted alkenyloxy;

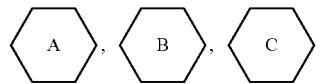

each is phenylene, or fluoro-substituted phenylene.

2. A compound selected from a group consisting of:

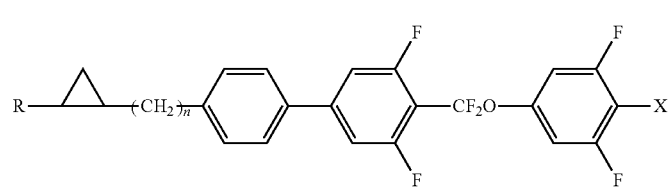

I1

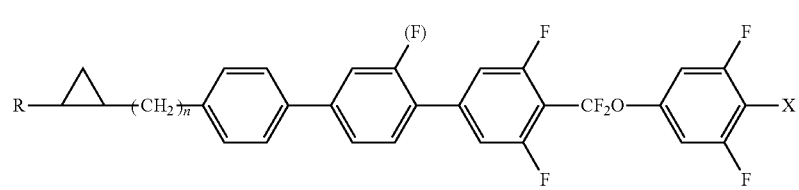

I2

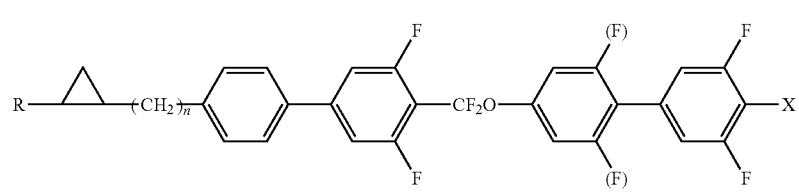

I3

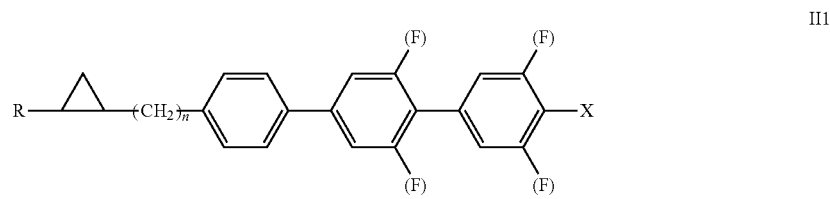

II1

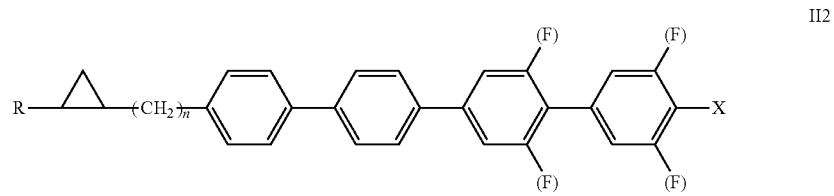

II2

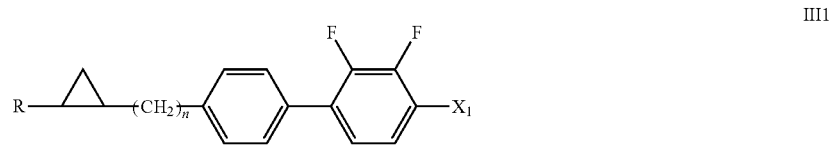

III1

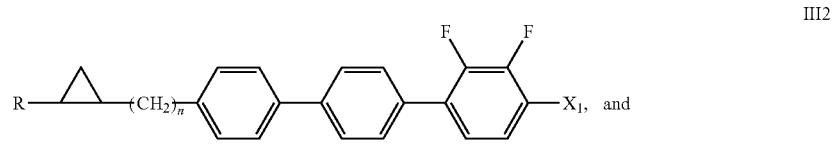

III2 and

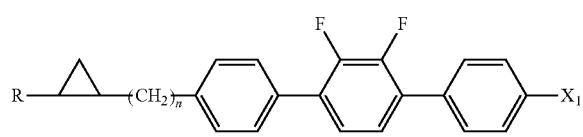

wherein
R is H or a C1-C5 alkyl;
n is 1 or 2;
X is F, Cl, OCF₃, CF₃, CN, H, a C1-C5 alkyl, a C1-C5 alkoxy, a C2-C5 alkenoxy, a C2-C5 alkenyl, or a C2-C5 fluoro-substituted alkenyloxy;
(F) is F or H; and
$X_1$ is a C1-C5 alkyl or a C1-C5 alkoxy.

3. A liquid crystal composition comprising component A, wherein component A comprises a compound of claim 1.

4. The liquid crystal composition of claim 3, further comprising components B and C, wherein component B comprises at least one compound of Formula VII, and component C comprises at least one compound of Formula VIII:

VII
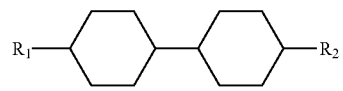

VIII
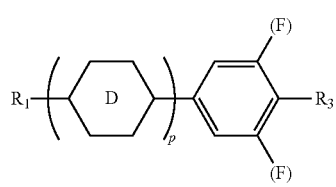

wherein
$R_1$ and $R_2$ each is a C1-C6 alkyl, or a C2-C6 alkenyl;
$R_3$ is H, F, a C2-C6 alkenoxy, or a C2-C6 fluoro-substituted alkenyloxy;

is one or more of 1,4-cyclohexylidene, 1,4-phenylene, or fluoro-1,4-phenylene;
p is 2 or 3; and
(F) is H or F.

5. The liquid crystal composition of claim 4, wherein a mass ratio of component A, B and C is 1-40:5-50:5-80.

6. The liquid crystal composition of claim 5, wherein the mass ratio of component A, B and C is 10-35:15-45:25-75.

7. The liquid crystal composition of claim 4, wherein the compound of Formula VII is selected from a compound of Formulas VII 1-VII 10:

VII 1
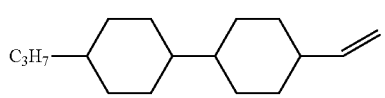

VII 2
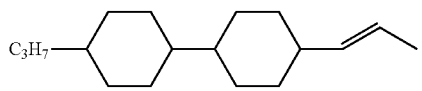

VII 3
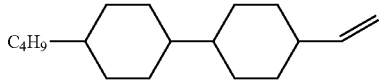

VII 4
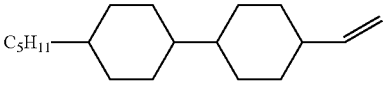

VII 5
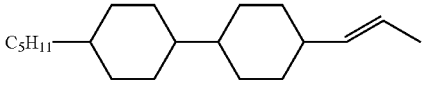

VII 6
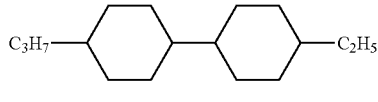

VII 7
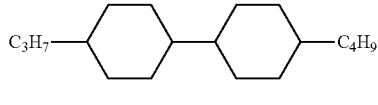

VII 8
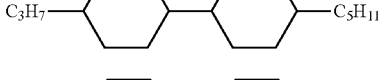

VII 9
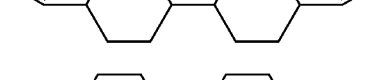

VII 10
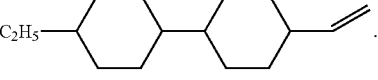

8. The liquid crystal composition of claim 4, wherein the compound of Formula VIII is selected from a compound of Formulas VIII 1-VIII 12:

VIII1
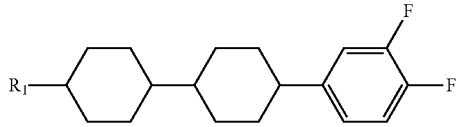

VIII2
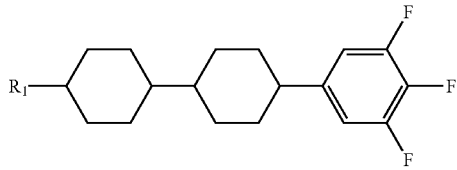

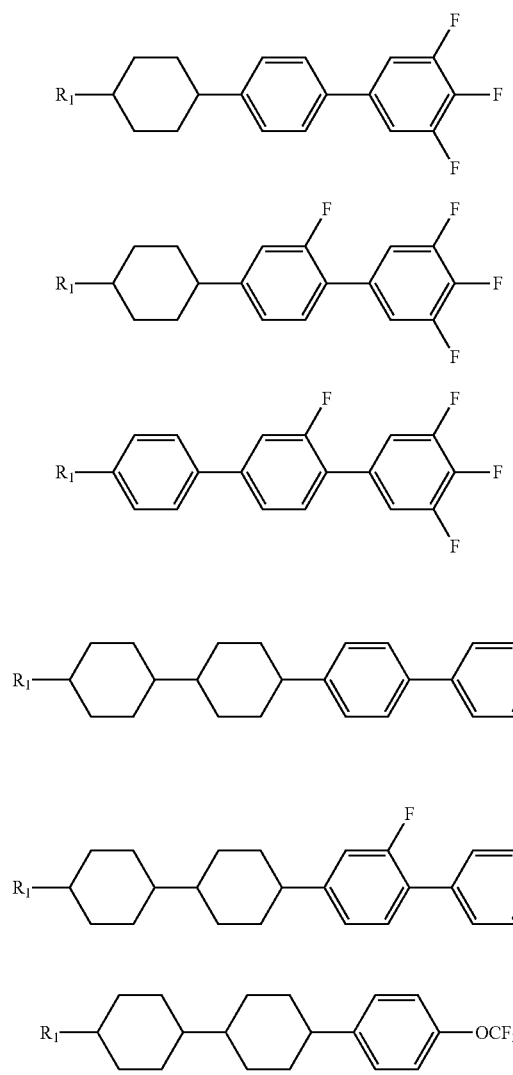

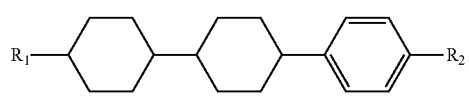

and wherein in the Formula VIII 1-VIII 12, $R_1$ and $R_2$ each is a C1-C6 alkyl or a C2-C6 alkenyl.

9. An electro-optical display comprising the liquid crystal compound of claim 1.

10. An electro-optical display comprising the liquid crystal composition of claim 4.

11. An electro-optical display of claim 9, wherein the electro-optical display is a VA display, IPS display, TN display, STN display or OCB display.

* * * * *